United States Patent
Khandani et al.

(10) Patent No.: US 7,318,185 B2
(45) Date of Patent: Jan. 8, 2008

(54) METHOD AND APPARATUS FOR SCRAMBLING BASED PEAK-TO-AVERAGE POWER RATIO REDUCTION WITHOUT SIDE INFORMATION

(75) Inventors: Amir Khandani, Kitchener (CA); Peiying Zhu, Kanata (CA); Wen Tong, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 760 days.

(21) Appl. No.: 10/314,347

(22) Filed: Dec. 9, 2002

(65) Prior Publication Data

US 2004/0093545 A1 May 13, 2004

Related U.S. Application Data

(63) Continuation-in-part of application No. 10/226,172, filed on Aug. 23, 2002, now Pat. No. 7,151,804.

(60) Provisional application No. 60/314,168, filed on Aug. 23, 2001, provisional application No. 60/314,169, filed on Aug. 23, 2001.

(51) Int. Cl.
*H03M 13/00* (2006.01)
(52) U.S. Cl. .................................................. 714/758
(58) Field of Classification Search ................ 714/758, 714/748, 752, 798, 707
See application file for complete search history.

(56) References Cited

U.S. PATENT DOCUMENTS

| 3,612,843 | A | * | 10/1971 | Aptroot-Soloway | ........ | 714/822 |
| 6,125,103 | A | | 9/2000 | Bäuml et al. | ................ | 370/203 |
| 6,515,980 | B1 | * | 2/2003 | Bottomley | .................. | 370/342 |
| 6,574,211 | B2 | * | 6/2003 | Padovani et al. | ........... | 370/347 |
| 6,671,832 | B1 | * | 12/2003 | Apisdorf | ...................... | 714/52 |
| 6,928,066 | B1 | * | 8/2005 | Moon et al. | ................ | 370/342 |
| 7,020,833 | B2 | * | 3/2006 | Watanabe et al. | ........... | 714/798 |
| 2002/0031082 | A1 | * | 3/2002 | Lundby et al. | ............. | 370/209 |
| 2002/0172179 | A1 | * | 11/2002 | Grimsrud | .................... | 370/342 |
| 2003/0053435 | A1 | * | 3/2003 | Sindhushayana et al. | ... | 370/342 |
| 2003/0095498 | A1 | | 5/2003 | Sato et al. | | |

FOREIGN PATENT DOCUMENTS

EP 0540232 10/1992

(Continued)

OTHER PUBLICATIONS

Robertston, Patrick; Wörz, Thomas; Bandwidth-Efficient Turbo Trellis-Coded Modulation Using Punctured Component Codes; IEEE Journal on Selected Areas in Communications, vol. 16, No. 2, Feb. 1998, pp. 206-218.

(Continued)

*Primary Examiner*—Guy Lamarre
*Assistant Examiner*—Fritz Alphonse

(57) ABSTRACT

Provided is a system and method for scrambling based peak-to-average power ratio reduction without side information. One of a set of scrambling sequences is used at the transmitter which results in either a minimum or acceptable peak power. Rather than transmitting side information identifying which of the set of scrambling sequences was selected, the scrambling sequence is also applied to the CRC, and using syndrome detection the receiver is capable of determining which scrambling sequence was used at the transmitter and can proceed with the necessary de-scrambling.

38 Claims, 24 Drawing Sheets

FOREIGN PATENT DOCUMENTS

| | | |
|---|---|---|
| EP | 0624018 | 4/1994 |
| JP | 11205279 | 7/1999 |
| JP | 11215091 | 8/1999 |
| WO | 9953662 | 9/1999 |
| WO | 9953662 | 10/1999 |

OTHER PUBLICATIONS

Khandani, Amir K.; Kabal, Peter; Shaping Multidimensional Signal Spaces—Part 1: Optimum Shaping, Shell Mapping; IEEE Transactions on Information Theory, vol. 39, No. 6, Nov. 1993, pp. 1799-1808.

Khandani, Amir K.; Kabal, Peter; Shaping Multidimensional Signal Spaces—Part II: Shell-Addressed Constellations; IEEE Transactions on Information Theory, vol. 39, No. 6, Nov. 1993, pp. 1809-1819.

Le Goff, Stéphane; Glavieux, Alain; Berrou, Claude; Turbo-Codes and High Spectral Efficiency Modulation; IEEE, 1994, pp. 645-649.

Wachsmann, Udo; Fischer, Robert F.H.; Huber, Johannes B.; Multilevel Codes: Theoretical Concepts and Practical Design Rules; IEEE Transactions On Information Theory, vol. 45, No. 5, Jul. 1999; pp. 1361-1391.

Papke, L., Fazel, K.; Cobmined Multilevel Turbo-Code with Mr-Modulation; IEEE, 1995; pp. 668-672.

Khandani, A.K.; Kabal, P.; Shaping of Multi-Dimensional Signal Consellations Using A Lookup Table; IEEE, 1992, pp. 927-931.

Khandani, A.K.; An Efficient Addressing Scheme for Shaping of Multi-Dimensional Signal Constellations Using a Lookup Table; IEEE, 1994, pp. 354-357.

Kozintsev, Igor; Ramchandran, Kannan; Robust Image Transmission Over Energy-Constrained Time-Varying Channels Using Multiresolution Joint Source-Channel Coding; IEEE, 1998, pp. 1012-1026.

Schuchert, Andreas; Makowitz, Rainer; Front End Architectures for Multistandard Digital TV Receivers; IEEE Transactions on Consumer Electronics, vol. 46, No. 3, Aug. 2000, pp. 422-427.

Kirkland, W.R.; Teo, K.H.; I/Q Distortion Correction for an OFDM Direct Conversion Receiver.

Schuchert, Andreas; Hasholzner, Ralph; Buchholz; Frequency Domain Equalization of IQ Imbalance in OFDM Receivers; IEEE, 2001, pp. 28-29.

A. K. khandani and P. Kabal; Address Decomposition for the Shaping of Multi-Dimensional Signal Constellations; IEEE, 1992, pp. 1774-1778.

Stefan H. Müller, Robert W. Bäuml, Robert F. H. Fischer and Johannes B. Huber; OFDM With Reduced Peak-to-Average Power Ratio by Multiple Signal Representation; Ann. Telecommunications., 52, No. 1-2, 1997, pp. 58-67.

T. N. Zogakis and J. M. Cioffi; Application of Shaping to Discrete Multitone Modulation; IEEE, 1994, pp. 1894-1898.

A. K. Khandani and P. Kabal; Efficient, Nearly Optimum Addressing Schemes Based on Partitioning the Constellation Into the Union of Blocks; IEEE, 1993, pp. 1076-1080.

P. Van Eetvelt, G. Wade and M. Tomlinson, Peak to Average Power Reduction for OFDM Schemes by Selective Scrambling, IEEE Electronics Letters, vol. 32, No. 21. Oct. 10, 1996, p. 1963-1964.

* cited by examiner

THE CONNECTIVITY OF PARTIAL SYNDROMES STORING IN THE LOOK UP TABLE
(7, 3) HAMMING CODE, GENERATOR POLYNOMIAL: X^3+3+1

- - - - → INDICATE CODED BIT 1
———→ INDICATE CODED BIT 0 the benefits of the scrambling based PAPR reduction technique, but which does not have the drawbacks of requiring the transmission of this side information and the associated bandwidth wastage and added complexity due to requiring additional error correction and possibly error detection techniques.

METHOD AND APPARATUS FOR SCRAMBLING BASED PEAK-TO-AVERAGE POWER RATIO REDUCTION WITHOUT SIDE INFORMATION

RELATED APPLICATIONS

This is a CIP of U.S. application Ser. No. 10/226,172 filed Aug. 23, 2002 now U.S. Pat. No. 7,151, 804. This application also claims the benefit of prior U.S. Provisional Application Nos. 60/314,169 and 60/314,168 filed on Aug. 23, 2001.

FIELD OF THE INVENTION

The invention relates to multi-carrier modulation systems and methods.

BACKGROUND OF THE INVENTION

Conventional systems and methods for multi-tone modulation employ a signal constellation for each of a plurality of center frequencies in which each possible permutation of data elements, such as bits, is represented uniquely.

A multi-tone signal consists of data elements modulated onto each center frequency signal constellation. This modulation may be done on a per frequency basis, or may be done in parallel using IFFT technology for example.

Disadvantageously, some permutations of constellation points for the frequencies will result in a high peak power in the multi-tone signal. Other permutations of constellation points for the frequencies will result in a low peak power in the multi-tone signal.

An example of this is shown in FIG. 1, where shown at 10 is a multi-carrier layout which may be used in OFDM for example. In this example, there are eight carriers. The amplitude of the multi-carrier signal results from complex addition of constellation points used for the multiple carriers. Most of the time, this complex addition will result in a value near some average value since the values being combined are typically somewhat random. An example of a somewhat random complex addition is given at 12 with the magnitude of the combination being indicated at 14.

In other cases, the complex addition will result in a large peak because the values all combine additively. An example of this is given at 16, where the magnitude of the combination is indicated at 18.

It would be advantageous to have a multi-carrier modulation method which did not suffer from these disadvantages.

To reduce the peak-to-average power ratio a proposed technique for multi-carrier systems such as OFDM and multi-code systems such as CDMA FL, is a scrambling based system. This scrambling based approach applies a number of different random sequences to an encoded and interleaved bit stream, and then after mapping the resulting encoded bit stream to an actual transmit signal, the signal having the least peak average power ratio is selected for transmission.

Disadvantageously, the scrambling based PAPR technique requires additional bandwidth to indicate to a receiver which particular scrambling sequence was used at the transmitter. This is referred to as side information. The transmission of the side information would require its own error correction and error detection techniques, substantially adding to the complexity of this "side information transmission". This is required for the receiver to be able to do the proper de-permutation.

It would be useful to have a system that provides the benefits of the scrambling based PAPR reduction technique, but which does not have the drawbacks of requiring the transmission of this side information and the associated bandwidth wastage and added complexity due to requiring additional error correction and possibly error detection techniques.

SUMMARY OF THE INVENTION

According to one broad aspect, the invention provides a method comprising: calculating a CRC (cyclic redundancy check) for a data block and combining the CRC with the data block; applying a plurality of different scrambling sequences to the CRC combined with the data block to generate a corresponding plurality of scrambled blocks; determining a respective communications performance characteristic associated with each of the scrambled blocks; and selecting one of the scrambled blocks for transmission as a function of the performance characteristics.

In some embodiments, the method further comprises: performing at least one signal processing step upon each scrambled block before determining the respective communications performance characteristic.

In some embodiments, performing at least one signal processing step upon each scrambled block before determining the respective communications performance characteristic comprises: performing at least one step from a group consisting of: channel encoding, interleaving, modulation.

In some embodiments, performing at least one signal processing step upon each scrambled block before determining the respective communications performance characteristic comprises: performing a frequency-to-time conversion operation.

In some embodiments, performing a frequency-to-time conversion operation comprises performing an inverse fast Fourier transform (IFFT).

In some embodiments, the communications performance characteristic comprises a peak power measurement or any measure representative of peak power.

In some embodiments, the communications performance characteristic comprises a peak power measurement or any measure representative of peak power determined by identifying a maximum value of a time domain signal output by the IFFT.

In some embodiments, the communications performance characteristic comprises a combination of peak power and an average energy measurement or any measure representative of the combined effect of the peak power and the average energy.

In some embodiments, the data block has a size smaller than a frequency-to-time conversion block size, the method further comprising: in respect of each of at least one additional data block: a) calculating a CRC for the additional data block and combining the CRC with the additional data block; b) applying a plurality of different scrambling sequences to the CRC combined with the additional data block to generate a corresponding plurality of scrambled blocks; wherein determining a respective communications performance characteristic associated with each of the scrambled blocks comprises: c) for each of a plurality of permutations of scrambled blocks, each permutation including one scrambled block for the data block and one scrambled block for each additional data block, combining the permutation of scrambled blocks and performing frequency-to-time conversion to generate a respective time domain signal; d) determining a respective communications performance characteristic for each time domain signal; and e) selecting one of the permutations of scrambled blocks for transmission as a function of the performance characteristics.

In some embodiments, the data block has a size larger than a frequency-to-time conversion block size, and wherein performing a frequency-to-time conversion comprises performing a respective frequency-to-time conversion operation in respect of each of a plurality of subsets of the scrambled block.

In some embodiments, applying a plurality of different scrambling sequences to the CRC combined with the data block to generate a corresponding plurality of scrambled blocks is done in sequence.

In some embodiments, applying a plurality of different scrambling sequences to the CRC combined with the data block to generate a corresponding plurality of scrambled blocks is done in sequence until a stopping criteria is satisfied.

In some embodiments, applying a plurality of different scrambling sequences to the CRC combined with the data block to generate a corresponding plurality of scrambled blocks is done simultaneously for multiple scrambling sequences.

In some embodiments, the method further comprises performing multi-tone modulation by: defining a respective signal constellation comprising a plurality of constellation points for each of a plurality of center frequencies;

defining for each tone and for each permutation of values for M data elements, a respective set of at least one constellation point any one of which may be used to represent the permutation of values for M data elements thereby providing a choice of constellation points for the permutation of values for M data elements, with at least one said set of at least one constellation point having more than one constellation point; for each scrambled sequence, generating a multi-tone signal by mapping data elements of the scrambled sequence to each of said plurality of signal constellations and where there is a choice of constellation points, selecting a constellation point which will result in a reduced peak average power ratio for the multi-tone signal; wherein the communications performance characteristic associated with each scrambled block is determined from the selected constellation points.

In some embodiments, selecting a constellation point which will result in a reduced peak power for the multi-tone signal where there is a choice of constellation points comprises one of: searching through all possible permutations of choices of constellation points for a set of constellation points which will result in an absolute minimum possible peak average power ratio; and searching through possible permutations of choices of constellation points for a set of constellation points which will result in a peak average power ratio which is less than a predetermined threshold.

In some embodiments, selecting a constellation point which will result in a reduced peak power for the multi-tone signal where there is a choice of constellation points comprises one of: searching through possible permutations of choices of constellation points for a set of constellation points with the objective of reducing the impact of the error signal caused by the clipping or other forms of nonlinear amplification caused by the large peak signal values. An example is to use an orthogonal projection method in an attempt to minimize the energy of the error signal.

According to one broad aspect, the invention provides a method comprising: encoding a data block using a cyclic code to generate an encoded block; applying at least one of a plurality of different scrambling sequences to the encoded block to generate a scrambled block, each of the plurality of different scrambling sequences being uniquely associated with a respective information; transmitting at least one scrambled block.

In some embodiments, the method further comprises: determining a respective communications performance characteristic associated with each of the scrambled blocks; and selecting one of the scrambled blocks for transmission as a function of the performance characteristics.

In some embodiments, only one of the plurality of different scrambling sequences is applied to the encoded block to generate a scrambled block, the one being selected in order to convey the respective information.

According to one broad aspect, the invention provides an apparatus comprising: a CRC encoder adapted to calculate a CRC (cyclic redundancy check) for a data block and combining the CRC with the data block; at least one scrambling sequence generator adapted to apply a plurality of different scrambling sequences to the CRC combined with the data block to generate a corresponding plurality of scrambled blocks; a signal selector adapted to determine a respective communications performance characteristic associated with each of the scrambled blocks and to select one of the scrambled blocks for transmission as a function of the performance characteristics.

In some embodiments, the apparatus further comprises: at least one of a channel encoder, interleaver and modulator adapted to process each scrambled block before determination of the respective communications performance characteristic.

In some embodiments, the apparatus further comprises: an FFT block adapted to performing a frequency to time conversion operation prior to determination of the respective communications performance characteristic.

In some embodiments, the communications performance characteristic comprises a peak power measurement or any measure representative of peak power.

In some embodiments, the communications performance characteristic comprises a combination of peak power and an average energy measurement or any measure representative of the combined effect of the peak power and the average energy.

According to one broad aspect, the invention provides a method of de-scrambling a sequence, the method comprising: maintaining a respective syndrome associated with each of a plurality of scrambling sequences; performing a CRC computation on the sequence to generate a CRC output; determining if there is a match between the CRC output and any of said syndromes; if there is a match between the CRC output and a particular one of the syndromes, applying the respective scrambling sequence to the sequence to generate a de-scrambled sequence.

In some embodiments, the method further comprises: receiving a signal; performing at least one signal processing step upon the received signal to generate the sequence.

In some embodiments, performing at least one signal processing step upon the received signal to generate the sequence comprises performing at least one step from a group consisting of: channel decoding, de-interleaving, demodulation.

In some embodiments, performing at least one signal processing step upon the received signal to generate the sequence comprises performing a time-to-frequency conversion operation In some embodiments, performing a time-to-frequency operation comprises performing a fast Fourier transform (FFT).

In some embodiments, the sequence comprises a plurality of smaller sequences each having a size smaller than a frequency-to-time conversion block size, the method further comprising: performing a time to frequency conversion operation on a received signal to generate the sequence; sub-dividing the sequence into the plurality of smaller sequences; wherein performing a CRC computation on the sequence to generate a CRC output comprises performing a respective CRC computation on each of the plurality of smaller sequences to generate a respective CRC output; and for each of the plurality of smaller sequences and respective CRC outputs: a) determining if there is a match between the respective CRC output and any of said syndromes; b) if there is a match between the respective CRC output and a particular one of the syndromes, applying the respective scrambling sequence to the smaller sequence to generate a de-scrambled sequence.

In some embodiments, the data block has a size larger than a frequency-to-time conversion block size, the method further comprising: receiving a plurality of signals, and performing a time to frequency conversion on each of the received signals, and combining outputs of the time to conversion operations to generate the sequence.

In some embodiments, the method further comprises: extracting information associated with the use of the respective scrambling sequence.

According to one broad aspect, the invention provides a method of de-scrambling a sequence, the method comprising: maintaining a respective syndrome associated with each of a plurality of scrambling sequences; performing a decoding operation associated with a cyclic code to generate a decoded output; determining if there is a match between the decoded output and any of said syndromes; if there is a match between the decoded output and a particular one of the syndromes, applying the respective scrambling sequence to the sequence to generate a de-scrambled sequence.

According to one broad aspect, the invention provides an apparatus comprising: at least one storage element adapted to maintain a respective syndrome associated with each of a plurality of scrambling sequences; a CRC device adapted to process a received data block to generate a CRC output; a descrambler adapted to determine if there is a match between the CRC output and any of said syndromes, and if there is a match between the CRC output and a particular one of the syndromes, to apply the respective scrambling sequence to the sequence to generate a de-scrambled sequence.

In some embodiments, the apparatus further comprises: receiving circuitry for receiving a signal; signal processing circuitry adapted to perform at least one signal processing step upon the received signal to generate the sequence.

In some embodiments, the apparatus further comprises at least one of: a channel decode, de-interleaver, and demodulater.

In some embodiments, the apparatus further comprises time-to-frequency conversion circuitry adapted to perform a time-to-frequency conversion operation.

In some embodiments, the time-to-frequency conversion circuitry comprises a fast Fourier transform (FFT) function.

In some embodiments, the apparatus is further adapted to extract information associated with the use of the respective scrambling sequence.

According to one broad aspect, the invention provides an apparatus comprising: CRC calculating means for computing a CRC (cyclic redundancy check) for a data block and combining the CRC with the data block; scrambling means for applying a plurality of different scrambling sequences to the CRC combined with the data block to generate a corresponding plurality of scrambled blocks; performance characteristic determination means for determining a respective communications performance characteristic associated with each of the scrambled blocks; and selecting mean for selecting one of the scrambled blocks for transmission as a function of the performance characteristics.

According to one broad aspect, the invention provides an apparatus comprising: syndrome maintenance means for maintaining a respective syndrome associated with each of a plurality of scrambling sequences; CRC computation means for performing a CRC computation on the sequence to generate a CRC output; syndrome comparison means for determining if there is a match between the CRC output and any of said syndromes; de-scrambling means for, if there is a match between the CRC output and a particular one of the syndromes, applying the respective scrambling sequence to the sequence to generate a de-scrambled sequence.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

According to an embodiment of the invention, in a multi-carrier system, a signal constellation is used which employs redundant constellation points for at least some combinations of data elements. The data elements may be bits but are not necessarily so. The multi-carrier system may for example be OFDM or other forms of multi-tone modulation.

For each carrier frequency of the multiple carriers, a respective signal constellation having a plurality of constellation points is defined. During each symbol period, one of the constellation points is transmitted on each of the multiple carriers.

Figure 2:
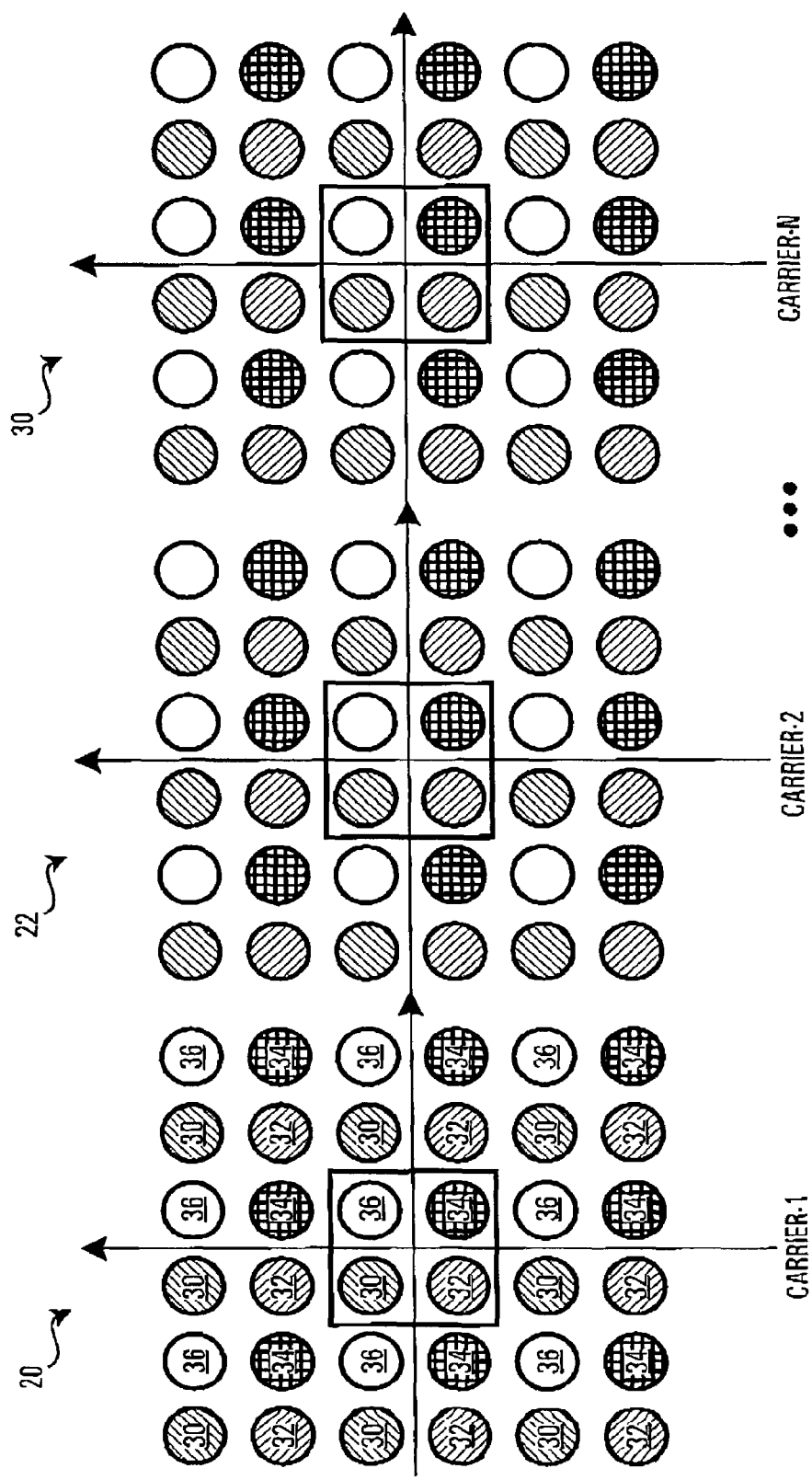
FIG. 2 shows an example of how 36 QAM can be used to reduce peak power using a method provided by an embodiment of the invention.

Referring to FIG. 2, an example is shown in which there are N carriers, and each carrier has an associated 36-QAM constellation. The first, second and Nth carriers having respective associated 36-QAM constellations generally indicated at 20, 22 and 30 respectively, the details of the third through N-1th not being shown. Each constellation point represents a pair of I and Q amplitude components transmitted at the carrier frequency. However, rather than mapping $\log_2 36$ bits (about 5.2 bits per symbol) to such a constellation per symbol for each carrier, a reduced number of bits per symbol are mapped, and in this example only two bits per symbol are mapped. Since only four constellation points are normally required to represent two bits, and since there are 36 constellation points available, it is possible to assign nine different constellation points of the 36 available constellation points for each two bit combination.

This is illustrated in the example of FIG. 2 by different shadings. In the constellation 20 for the first carrier, there are nine constellation points 30 having diagonal to the right stripes which have been allocated to represent a first of four possible permutations of two bits, nine constellation points 32 having diagonal to the left stripes which have been allocated to represent a second of four possible permutations of two bits, nine constellation points 34 having mesh fill which have been allocated to represent a third of four possible permutations of two bits, and nine constellation points which are shown in white which have been allocated to represent a fourth of four possible permutations of two bits. The constellations 22, 30 of the other carriers are similarly shown in FIG. 2. Any one of the nine constellation points can be used to represent the same two bits.

It is not necessary to define an equal number of constellation points to each pair of bits, but this is done in the preferred embodiments. It is also not necessary to have the constellation points used to represent a given pair of bits equally spaced as in the above example, but this is preferred. It is of course to be understood that any constellation may be used for each of the N carriers, and they need not even be the same constellations. What is essential is that each constellation include some redundant mappings, and more generally, at least one constellation needs to include some redundant mappings The larger the number of redundant mappings made available, the more easily the peak power will be reduced as described below.

For the example of FIG. 2, the multi-carrier signal will consist of a constellation point selected from the group of nine for the first carrier associated with the two bits to be transmitted on that carrier, plus a constellation point selected from the group of nine for the second carrier, and so on. There are thus $9^N$ different ways to represent the same 2N bit sequence.

Figure 1:
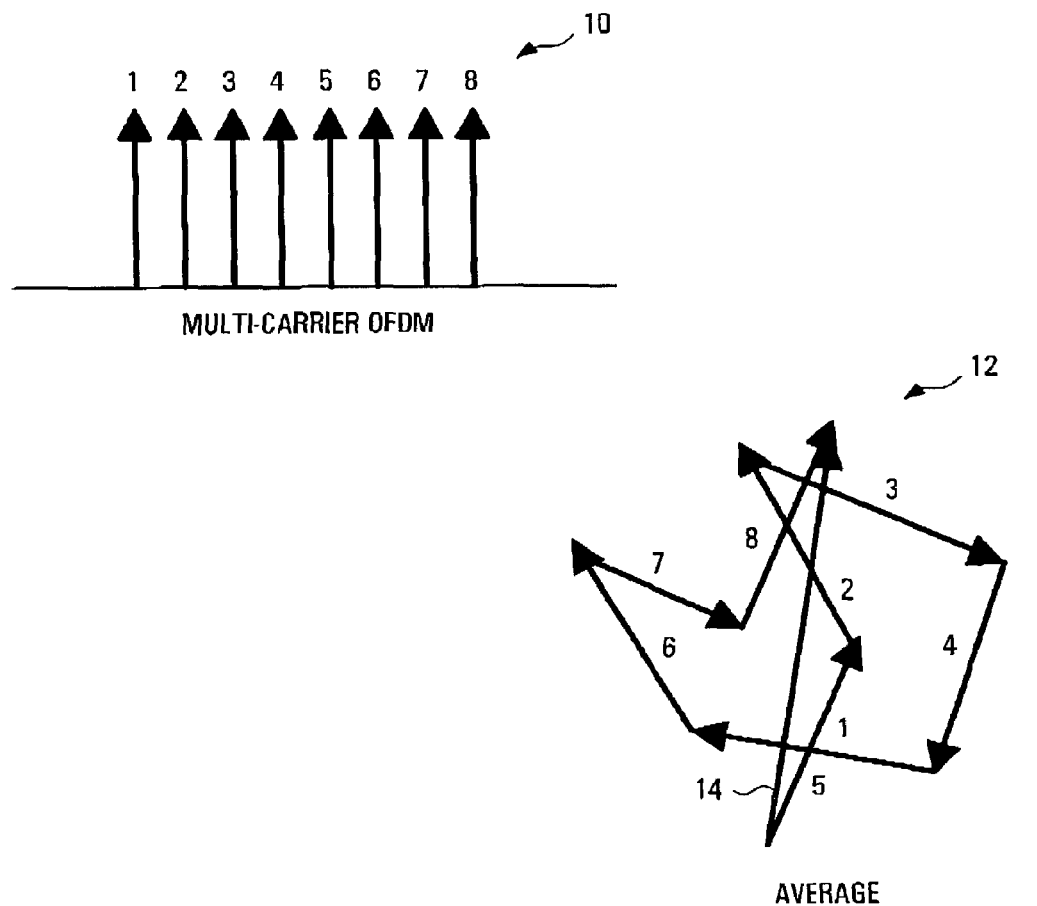
FIG. 1 is an example of how a high peak power may result with conventional multi-carrier modulation methods.

Referring back to FIG. 1, recall that the peak power transmitted for a multi-carrier signal at a given instant is determined by performing a complex addition of the complex amplitude of each of the carriers. For a given N bit sequence, if the constellations of FIG. 2 are used, then each of the possible $9^N$ different ways to represent the same N bit sequence will result in a respective different complex addition for the multi-tone signal, and will result in a different peak power. A particular representation is selected which will result in an acceptable and in most cases reduced peak power.

Figure 3:
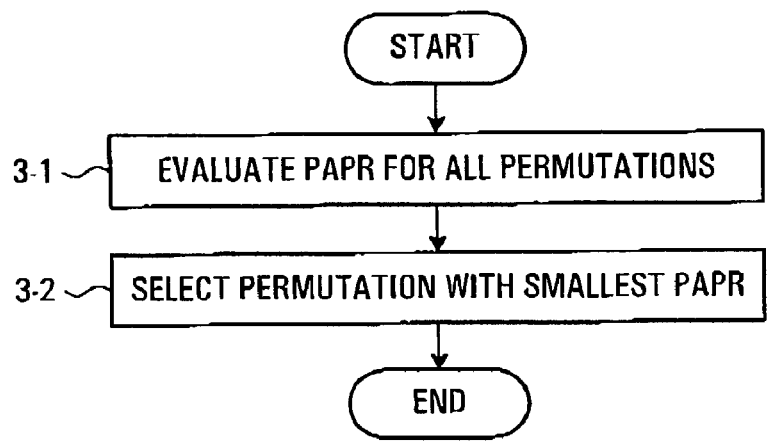
FIG. 3 is a flowchart of a first method of selecting constellation points which will result in a reduced PAPR.

In a first embodiment shown in the flowchart of FIG. 3, where there is a choice of constellation points, a method is provided which involves evaluating the peak average power ratio for all the permutations (step 3-1) and then searching through all possible permutations of choices of constellation points for a set of constellation points which will result in the smallest possible peak average power ratio (step 3-2). In the above described example, this involves searching through all thus $9^N$ different possibilities for the one which has the minimum peak power. In one implementation, this searching is done in real time, each time a given set of 2N bits is to be modulated. In another implementation, given that the answer will always be the same, then if 2N is sufficiently small, the search can be conducted a priori for each possible bit sequence of length 2N, and a table lookup produced mapping each 2N bit sequence to the corresponding permutation which results in the absolute minimum peak power possible.

In another embodiment, rather than searching for all possibilities, a predetermined threshold is established which represents an acceptable peak power. Searching is then conducted in real time for any of the possibilities which will satisfy this threshold. When a possibility is found which has a peak power which is less than the threshold, the searching is stopped.

Figure 4:
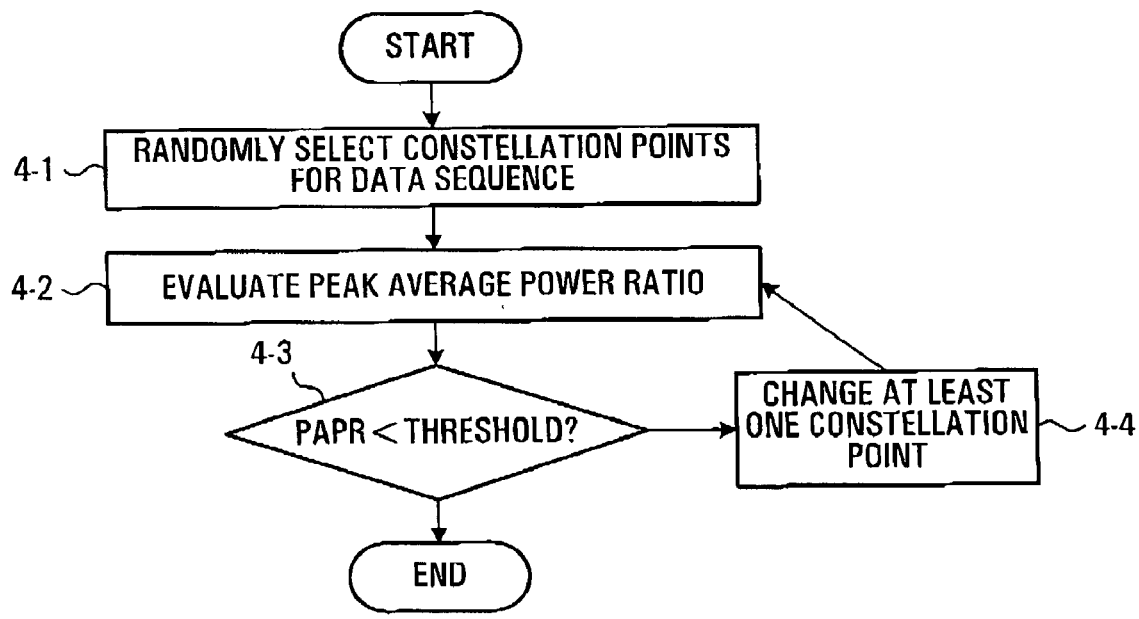
FIG. 4 is a flowchart of a second method of selecting constellation points which will result in a reduced PAPR.

Any suitable search technique may be used to hone in on an appropriate particular mapping for a given input which results in an acceptable peak power One example searching technique is shown in the flowchart of FIG. 4. Searching for a combination of single constellation points in this example starts at step 4-1 with randomly selecting a constellation point from each particular respective plurality of constellation points. Next, at step 4-2, the peak average power ratio is evaluated using the randomly selected constellation points. In step 4-3, in the event the peak power ratio is less than the pre-determined threshold, the search is stopped. In the event the peak power ratio is less than the pre-determined threshold, then at step 4-4, repeatedly, until the peak average power ratio is less than the pre-determined threshold, at least one of the randomly selected constellation points is changed to be a different constellation point in the particular respective plurality of constellation points to which the at least one of the randomly selected constellation points belongs and the peak average power ratio is re-evaluated. This is repeated until the peak average power ratio is below the threshold.

In another embodiment, where there is a choice of constellation points available, a method is provided which involves searching through possible choices of constellation points for a set of constellation points with the objective of reducing the impact of the error signal caused by the clipping or other forms of nonlinear amplification (caused by the large peak signal values). An example is to use an orthogonal projection method in an attempt to minimize the energy of such an error signal. In this case, if the constellation dimensions are divided into orthogonal subspaces (say by a partioning of the dimensions in the frequency domain), then the selection based on orthogonal projections in these orthogonal sup-spaces can be carried independent of each other (reducing the search complexity).

OFDM Transmitter Structure with Constellation Shaping and Peak Average Power Ratio Reduction Algorithm A detailed example of the above described peak average power ratio reduction algorithm will now be described in the context of an OFDM transmitter. This embodiment also features a novel approach to constellation shaping.

Figure 5:
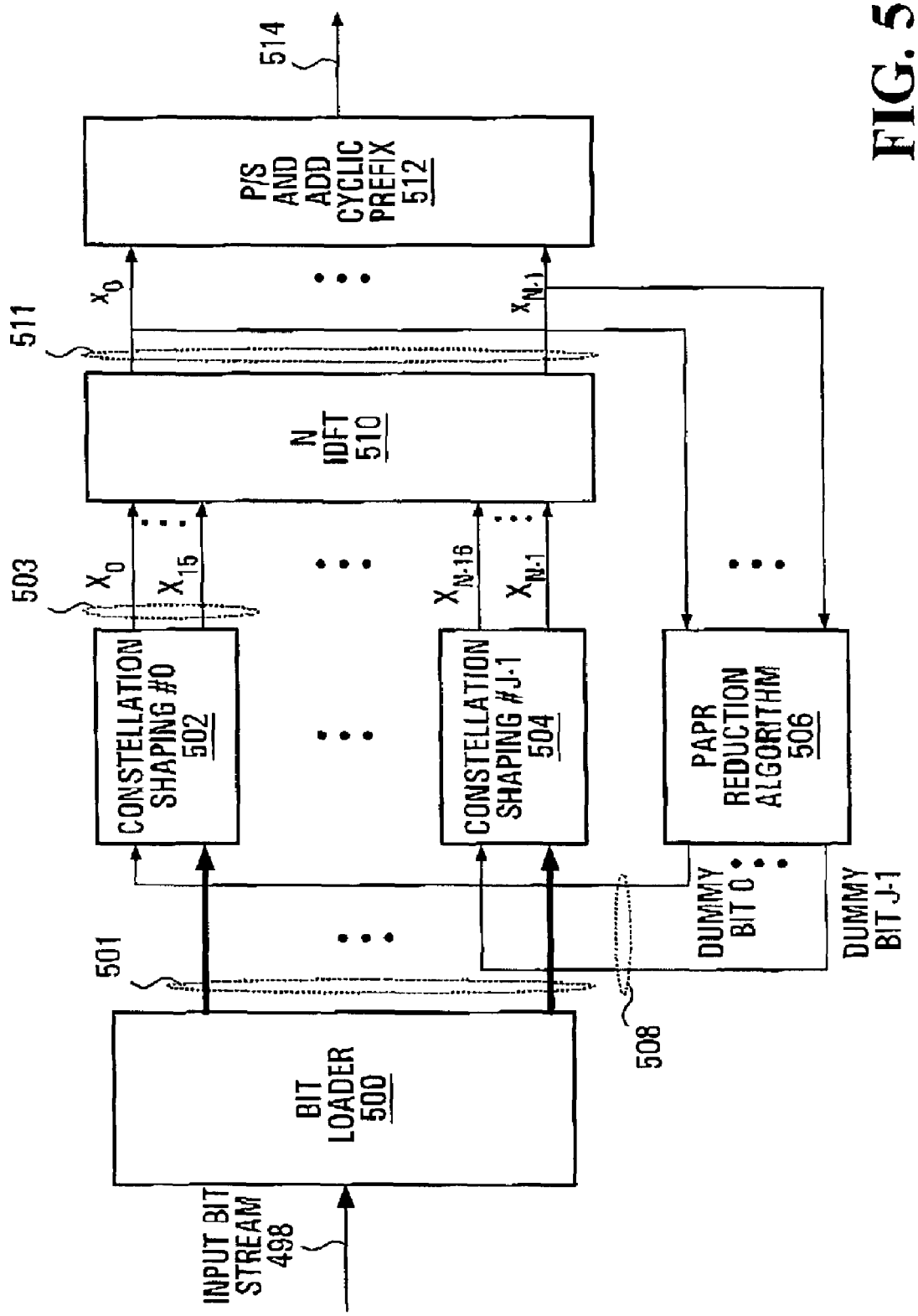
FIG. 5 is a block diagram of an OFDM transmitter structure with constellation shaping and PAPR reduction algorithm.

The OFDM transmitter structure provided by this embodiment of the invention is shown in FIG. 5. The transmitter has an input bit stream 498 which is input to a bit loader 500 where data bits are grouped into J groups generally indicated by 501. It is assumed that there are J different groups of sub-carriers. In FIG. 5, blocks 502, 504 represent constellation shaping algorithms which are performed for two of the J different groups of sub-carriers. Similar blocks are provided for the other groups of sub-carriers. The input to each constellation-shaping algorithm 502, 504 is composed of two sets of bits, data bits (one of the J groups 501 formed by the bit loader 500) and one or more dummy bits produced by a PAPR reduction algorithm generally indicated by 506. The dummy bits produced by the PAPR reduction algorithm 506 are generally indicated by 508. The value of these dummy bits is determined by the PAPR reduction algorithm 506 as detailed below.

The output of the constellation-shaping algorithms 500, 502 define 2-D symbols for each of the respective group of sub-carriers. Further details are presented for the example in which there are 16 sub-carriers assigned to each of the J groups of bits in which case there are 16×J sub-carriers in total. For each group of sub-carriers, an independent constellation-shaping algorithm is used.

For this example, each constellation shaping algorithm defines a 2-D symbol for each of 16 sub-carriers. The output of the first constellation shaping algorithm 502 is indicated at 503, and the output of the last constellation shaping algorithm 504 is indicated at 505. The outputs of all the constellation shaping algorithms are input to an IDFT (inverse discrete Fourier transfer) function 510. Thus in this example, the input to the IDFT 510 is an N=16*J dimensional complex vector, where N represents the number of carriers (tones) used in the transmitter. Each carrier transmits a point from a 2-D QAM constellation.

Modulation is performed by the IDFT 510. The output of the IDFT 511 is passed through a parallel to serial converter 512 and a cyclic prefix is added to each OFDM symbol to generate the overall output.

The dummy bits 508 and data bits 501 are mapped to constellation points by using the constellation-shaping algorithms, which are described in detail below.

Constellation Shaping Algorithm

Shaping is a method for reducing the power required to transmit data relative to the power required for an unshaped (cube) constellation while keeping the minimum distance between constellation points the same. Shaping gain is achieved by using a larger constellation size compared to an unshaped constellation where the increase in constellation size is given by a constellation expansion ratio (CER). The CER is defined as the ratio of the number of points per 2-D of a shaped constellation to the minimum required number of points per 2-D to achieve the same overall rate in an unshaped constellation.

In the example structure of FIG. 5, an independent constellation-shaping algorithm for each 32-D vector (16-D complex dimensions) is provided. Each carrier transmits a 2-D point so a group of 16 2-D carriers represents a 32-D vector. Each such group will be referred to as a "frame" and each 2-D point will be referred to as a "symbol".

Figure 6:
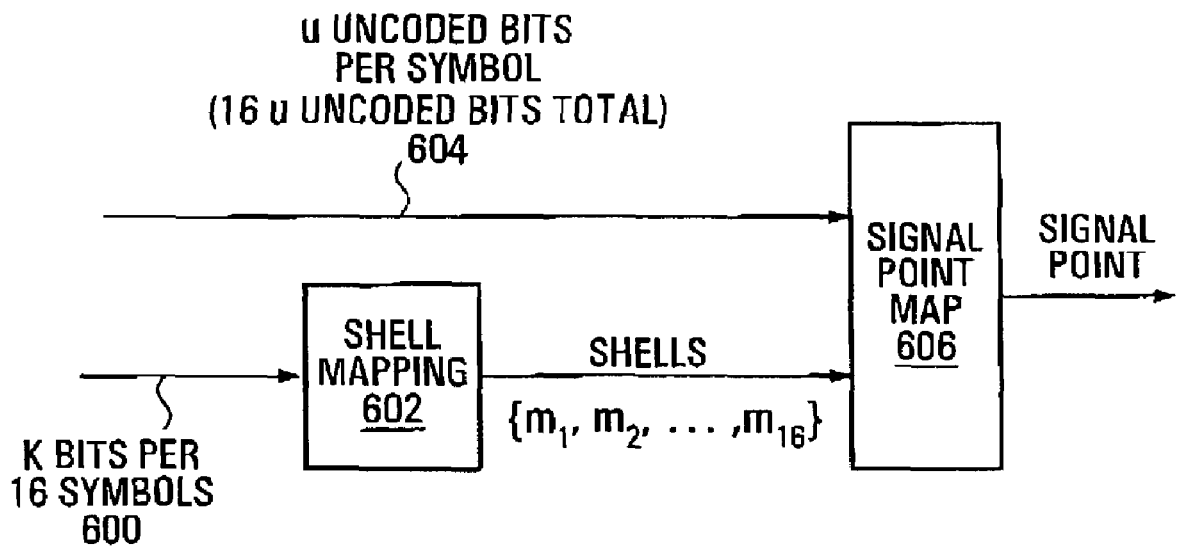
FIG. 6 is a simple block diagram of the constellation shaping algorithm of FIG. 5.

A very simple view of constellation shaping is shown in FIG. 6. As detailed below, each constellation is divided into M rings or shells of symbols. A shell number defines such a shell, and a point in the shell define a symbol. For example, for each frame, K shaping bits 600 can be mapped into sixteen shells $\{m_1, m_2 \ldots m_{16}\}$ with a shell mapper 602 and u uncoded data bits 604 per symbol select a point in each shell with signal point map 606. The dummy bit produced at the output of the PAPR reduction algorithm 506 of FIG. 5 is used as one of the K shaping bits 600. Let B be the number of bits sent per shaping frame. It can be seen that B=K+16u since there are 16 symbols per frame. The role of the shell mapping 600 is to select one of the 16 shells for each of the 16 sub-carriers. Then, for each of the rings thus selected, u uncoded bits select a particular point within the shell.

Let M be the number of shells per symbol, in other words the number of shells the constellation is divided up into. The number of constellation points L used for a symbol is then given by $L=M \times 2^u$. The CER can be determined (actual number of constellation points per symbol)/(minimum number of constellation points per symbol). Since each symbol carries u data bits +K/16 shaping bits, the minimum constellation size is $2^{u+K/16}$. The actual constellation size is $M \times 2^u$. Thus the CER is $$\frac{M \times 2^u}{2^{u+K/16}} = \frac{M}{2^{K/16}}.$$

In a preferred embodiment, M is chosen such that a CER per 2-D is at least 1.35, which gives $M \geq 1.35 * 2^{K/16}$.

As an example, the minimum values of M to achieve a CER of 1.35 for various values of K are shown in Table 1.

TABLE 1

| Different K and M values | |
| --- | --- |
| K | $M \geq 1.35 * 2^{K/16}$ |
| 25 | M ≥ 3.99 |
| 41 | M ≥ 7.97 |
| 57 | M ≥ 15.95 |

The L constellation points for a symbol are ordered as follows: Shell 0 contains the $2^u$ least-energy points, shell 1 contains the $2^u$ next lowest energy points, and so forth up to shell M-1. A cost $c_i$ is assigned for each shell i, which is proportional to the average power of the points in the shell i.

Various tree structures for mapping the K shaping bits to the rings (the shell mapping 602 of FIG. 6) can be employed Next, two different examples of the tree structures which may be employed will now be presented one based on the Huffman tree and the other based on a Fixed tree.

Huffman Tree

Figure 7A:
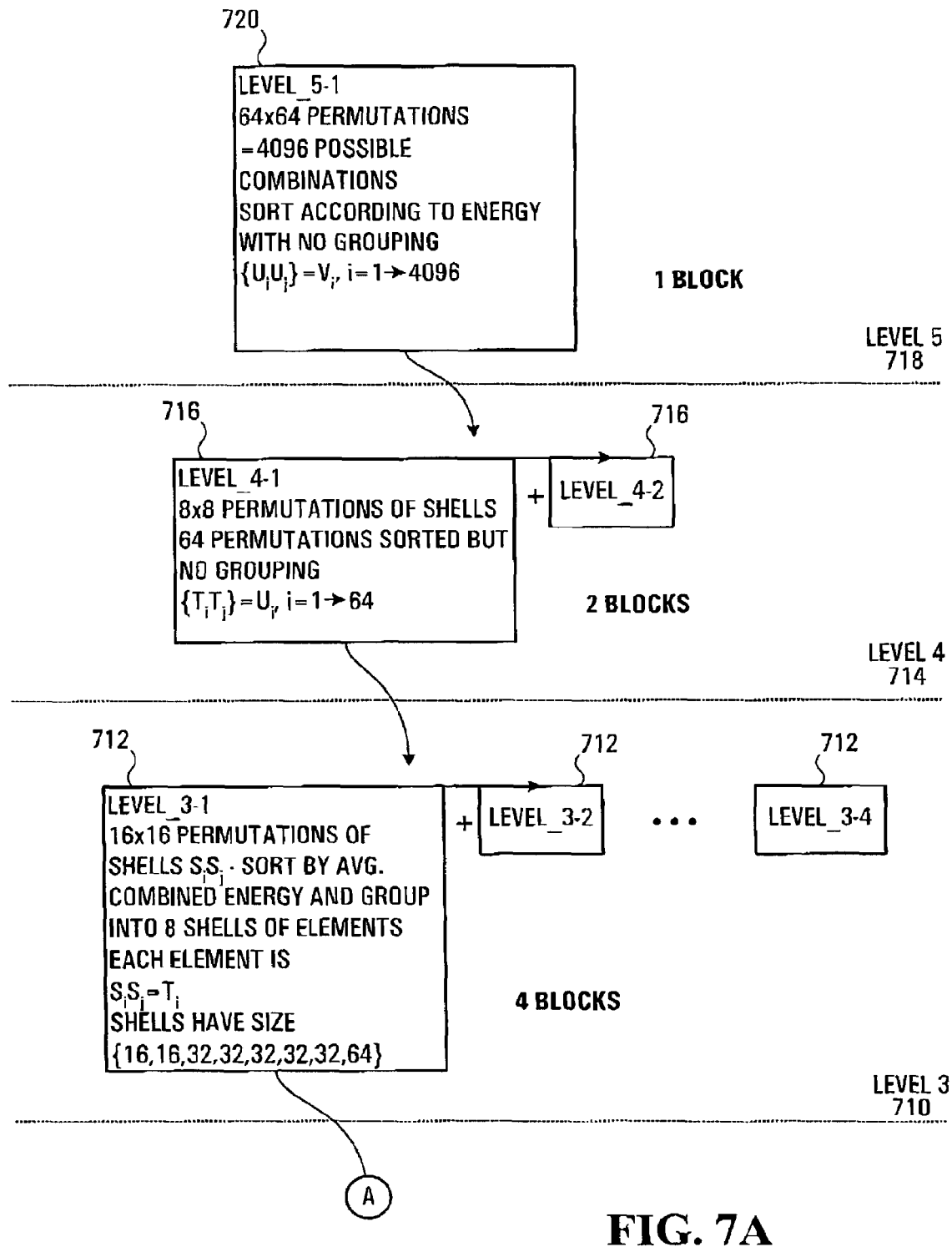
FIGS. 7A, 7B and 7C provide a breakdown of how addressing may be performed within one constellation-shaping algorithm of FIG. 5.
Figure 7A:
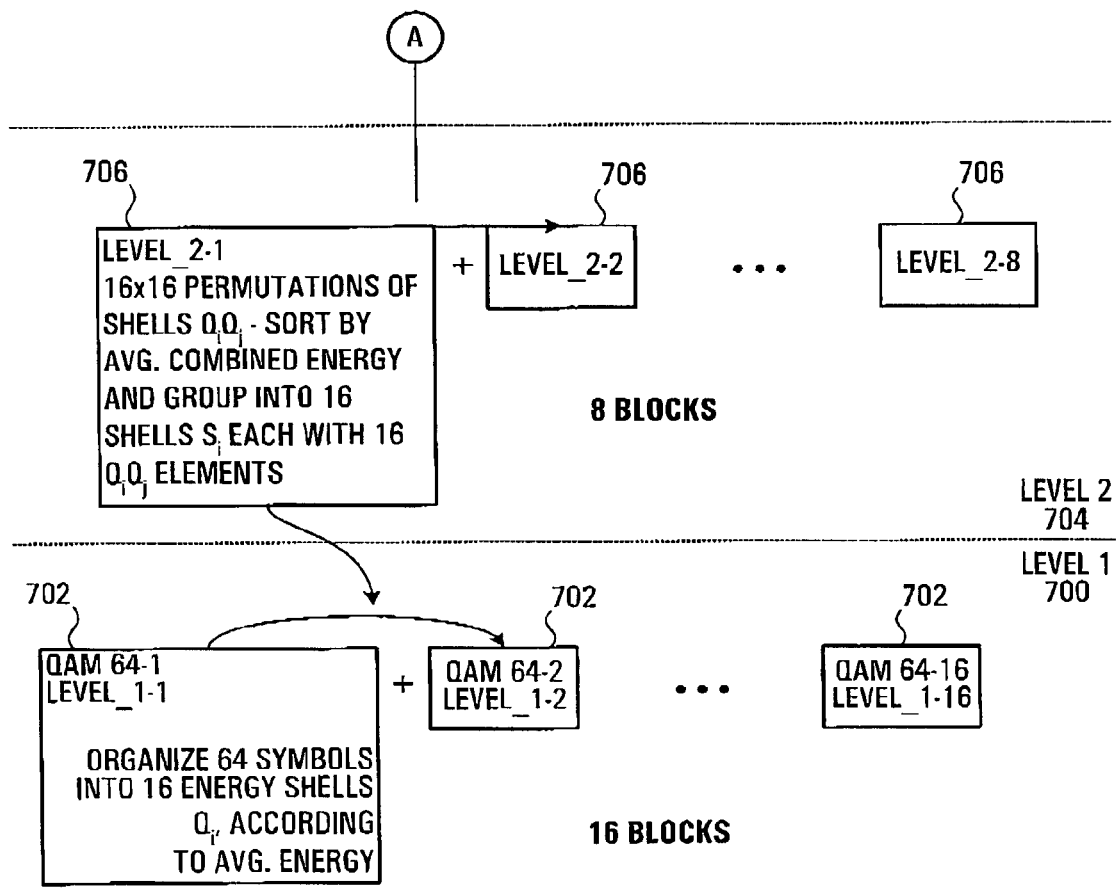

An example will be presented in the context of using a QAM-64 constellation for each sub-carrier. Mapping is performed with "level 1" at the bottom and "level 5" at the top. Referring to FIG. 7A, level 1 generally indicated at 700 is made up of 16 blocks 702 where each block represents one transmitted symbol and a symbol is a point from a QAM-64 constellation. The blocks are labeled QAM64-1 (Level_1-1), ..., QAM64-16 (Level_1-16). The 64 available points for each 2D symbol are sorted in a non-descending order according to their energy and grouped into 16 rings each with 4 points each. (Ring 0 is composed of 4 points with the least energy and ring 15 is composed of 4 points with the largest energy). The energy of a ring is the average energy of the 4 points in that ring. Each ring for a given block at level 1 is $Q_i$, i=0, ..., 15.

Level 2 generally indicated at 704 is made up of eight blocks 706. Two adjacent level 1 blocks are combined to form one level 2 block. Each element in a level 2 block has pointers to two rings in different blocks at level 1. In other words, each element at level 2 is $Q_iQ_j$ for some i,j. As at level 1, the elements of each block of level 2 are organized into has 16 rings. Since there are 256 possible different combinations of level 1 rings, each level 2 block has 256 elements. The energy of each element at level 2 is the average energy of the two rings at level one, which level 2 element is pointing to. Again, these 256 elements are sorted according to their energy and grouped into 16 shells each with 16 elements. (Shell 0 is composed of 16 elements with the least energy and shell 15 is composed of 16 elements with the largest energy). This defines sixteen shells Si, i=0, ..., 15 for each level_2 block each containing sixteen $Q_iQ_j$ combinations.

Level 3 generally indicated by 710 is made up of 4 blocks 712 Two adjacent level 2 blocks 706 are combined to form one level 3 block 712. Each element in a level 3 block has pointers to two shells in different blocks at level 2. In other words, an element of Level 3 is $S_iS_j$ for some i,j. There are 256 possible different combinations of level 2 shells, so each level 3 block has 256 elements. The 256 elements are sorted according to their energy and grouped into 8 shells $T_i$, i=1, 8. To reduce the addressing complexity, the merging at this stage is achieved using non-equal number of elements. A specific example with very good performance is to select the shells to have sizes of {16, 16, 32, 32, 32, 32, 32, 64}. Elements with the least energy are placed in smaller size shells. Shell 0 is composed of 16 elements with the least energy and shell 7 is composed of 64 elements with the largest energy. Thus eight shells $T_i$, i=1, 8 are defined for each level 3 block, each containing a variable number of $S_iS_j$ combinations.

Level 4 generally indicated at 714 is made up of two blocks 716, where two adjacent level 3 blocks 712 are combined to form one level 4 block 716. Each element of a level 4 block has pointers to two shells in different blocks at level 3. Since at level 3 each block has 8 shells, there are 64 possible different combinations of level 3 shells, so each level 4 block has 64 elements $T_iT_j$ for any i, j. Elements are sorted according to their energy but no grouping is performed at level 4. Thus, level four has 64 elements $U_i$ sorted according to energy.

Level 5 generally indicated at 718 is made up of a single block 720, which is formed by the two level 4 blocks 718. Each element of the level 5 block has pointers to two elements in different blocks at level 4. Since in level 4, each block has 64 elements, there are 4096 possible different combinations of level 4 elements $U_iU_j$ for any i, j, and thus the level 5 block has 4096 elements. Level 5 elements are sorted according to their energy without doing any grouping to produce a set of level 5 element $V_i$, i=1, ..., 4096.

In the absence of shaping, 12 bits are required to select one element at level 5. Shaping gain is achieved by mapping fewer than 12 bits to level 5 such that there is redundancy in the points mapped to a given set of bits. A subset of level 5 elements is selected with the least energy.

From an input consisting of a set of R bits, the first x-bits are used to select an element at level 5. 12 bits are required to select an element, but to achieve shaping gain, fewer than 12 are used. Preferably, 7, 8 or 9 bits are used to select the level 5 element.

Each element at level 5, points to two elements at level 4, and each element at level 4 points to 2 shells at level 3. Thus, the selected element at level 5 points to 4 shells at level 3. There is no grouping at level 4 so no additional bits are required to select level 4 elements. An element is to be selected in each shell at level 3 to go down to level 2. Since the number of elements in each shell is not the same, a variable number of bits from the input at level 3 needs to be read. In order to select an element from a shell of size 16,32 or 64, 4, 5 or 6 bits are required respectively. Thus, 4, 5 or 6 bits from the input are read to select an element in a shell for each block at level 3 (according to its size), Each selected element at level 3 points to two shells at level 2 where each shell has 16 elements. An element needs to be selected in each shell at level 2 to go down to level 1. For each block at level 2, 4 bits are read from the input to select one of 16 elements in a shell. The selected element at level 2 points to two rings at level 1 where each ring has 4 points. 2 bits are read from the input to select one of 4 points in a ring at level 1.

Let $R_n$ be the number of bits needed to be read from the input to go down from level n to level n−1, n=1 to 5. At level 1, for each block a point is to be selected from a set of 4 points, which requires 2 bits per block. As there are 16 level 1 blocks, $R_1$ 16*2=32. At level 2, for each block an element is to be selected from a set of 16 elements, which requires 4 bits per block. As there are 8 level 2 blocks, $R_2$=8*4=32. The number of bits required at level 3 varies, as shell sizes at this level are not same. $R_3$ may vary between 16 (which corresponds to each shell having 16 elements in all level 3 blocks) and 24 (which corresponds to each shell having 64 elements in all level 3 blocks). $R_4$ is zero as no grouping is performed at level 4. $R_5$ is selected to vary such that the total number of bits used in addressing is fixed and the sum of $R_n$, n=1 to 5 is the size R of the input.

Lets assume level 5 has $2^x$ number of elements, and so x-bits are used to select a single element at level 5. This subsequently gives pointers to two level 4 elements, note that no bits are required at level 4. From level 4 down, pointers are giving reference to shells, so a certain number of bits are required to select an element within that given shell. The bits required depend on the size of the shell. Since level 3 shell sizes vary, the bits used at this level are not constant, so each shell must specify the bits required and grab them from the input accordingly. Level 2 and 1 has fixed shell size of 16, hence 4 bits are needed for selection. It is required that the total number of bits used for the signal constellation be a constant value, and because bits required at level 3 vary, a method must be introduced to adjust the bits used at the top level selection so that the sum of bits is always constant.

Suppose at the top level, there are a possible total of I (=4096) elements and a subset of size i is required to accommodate a fixed total of R input bits. This means only i out of I elements are used. The selection of a value for i is determined by experimentation, with different values attempted until R=size of input, K=number of shaping bits are both integers. In this example, as will be explained, with an input of 121 bits, 57 of which are used as shaping bits, i=194 of the 4096 elements are required. Please note that R=κ+16u, so u=4 meaning tour information bits are used to select a point from the 16 element level 1 shell.

In order to determine the appropriate i, κ is computed as $$K = \log_2\left[\sum_{n=1}^{i} 2^{R'_n}\right]$$

where $R'_n$ is the required number of shaping bits to go down the tree from the top element n, then $K-R'_n$ is the number of bits used at the top level to select element n.

Figure 7B:
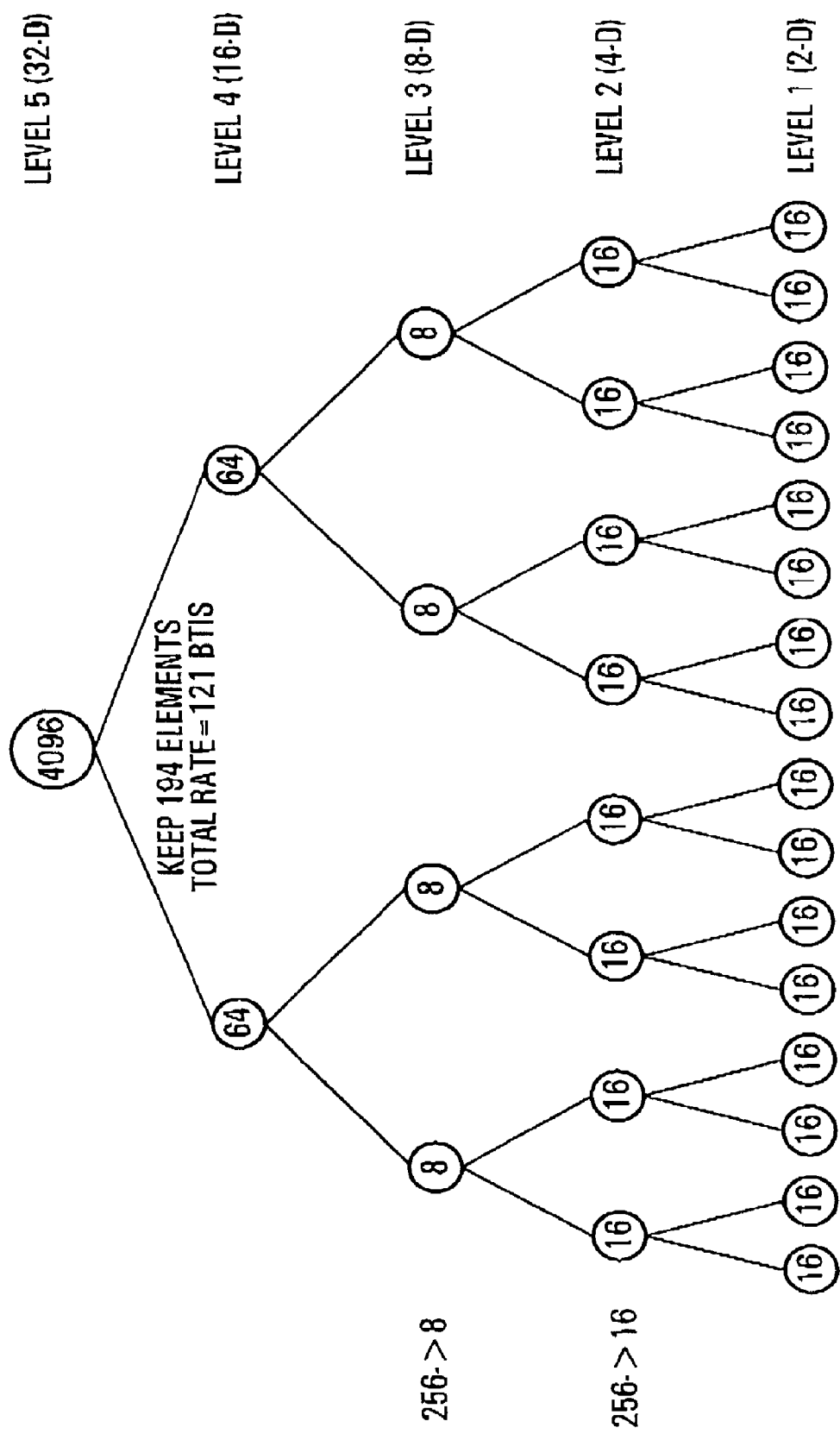
Figure 7C:
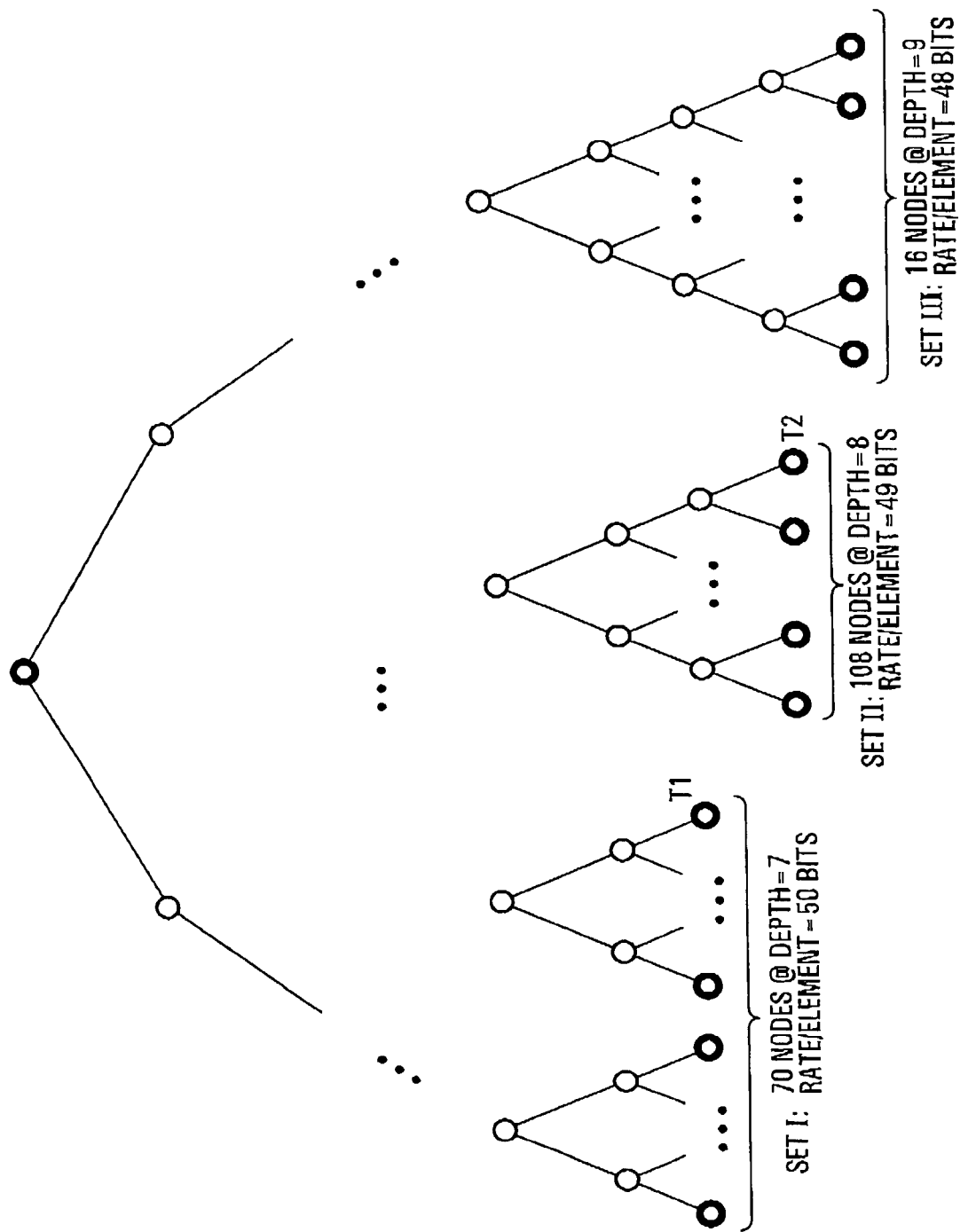

FIG. 7C is an example Huffman tree structure used for addressing, and FIG. 7B shows the tree structure of the hierarchy used for addressing. FIG. 7C shows the total of 194 elements out of 4096 possible elements. The first 70 are used with 7 bit addressing at level 5. 54 of the remaining 58 7 bit addresses are used as the first 7 bits of eight-bit address, with 54×2=108 possible 8 bit level 5 addresses. The remaining 4 of 58 7-bit addresses are used as the first 7 bits of 9 bit addresses with 4×4=16 possible 16 bit level 5 addresses. Thus we have $R_n$=48, 49, 50 and $(70*2^{(50)})+(108*2^{(49)})+(16*2^{(48)})=2^{(57)}=$
$2^K$=number of shaping mappings possible.

As indicated above, different values of i are computed until R and K turn out to be integers. Furthermore, R and K should be selected to provide the required value of CER, say, $$\frac{256}{2^{R/16}} \cong 1.35$$

Let $b=κ-R'_n$, then $b \in \{b_1, \ldots, b_j=b_1+j-1\}$ where $b_1$ is the smallest value of b and j is the number of different values that b can take on. Top-level elements in the subset are grouped according to the value of b. Then a code can be assigned to each element using a Huffman tree structure. Elements, having value starting from $b_1$ to $b_j$, are placed at different levels at the bottom of the tree from left to right. Each element will be placed in the tree with exact height of b, meaning that it can be represented by a code of length b. This is equivalent to assigning code from a first set of elements from 0 to $s_1$-1 for elements with $b_1$, $s_1$, $s_2 \ldots s_j$ are the total number of elements in respective sets with the value of $b_1, \ldots, b_j$ respectively. For elements with $b_2$, one least significant bit is added so code will start from $2×s_1$ to $2×s_1+s_2-1$. Similarly, elements with $b_3$ starts from $2×(2×s_1+s_2)$ to $[2×(2×s_1+s_2)]+s_3-1$ and so on.

One of the optimum configurations for the level 3 shells is {16, 16, 32, 32, 32, 32, 32, 64} (refer to FIG. 7C). It is found that to transmit R=121 bits, i should be 194. Within the subset of i elements, there are only j=3 different values of b and they are 7, 8 or 9. Hence at level 5, there are 194 elements separated into 3 sets and the specified element can be located through arithmetic manipulation. At level 4, there are two blocks each contains 64 elements. Finally, all blocks in level 3 to level 1 each has 256 elements, only the shell groupings vary.

Thus at level 5, only a subset of the 4096 elements required to map the input are selected. In this example, since 7, 8 or 9 bits will be used at level 5, only the first 194 elements out of 4096 elements are required, these being the 194 elements at level 5 with the smallest energy. These 194 elements are based on the number of bits they require at level 3. The 194 elements are comprised of three sets, Set 1, Set 2 and Set 3 of sizes $S_1$=70, $S_2$=108 and $S_3$=16 with $R_3$ values of 18, 17 and 16 bits respectively. Thus $R_5$ must be 7, 8 or 9 for Set 1, Set 2 or Set 3 respectively to have a total of 25 bits used in $R_3$ and $R_5$.

The Huffman tree structure is then used for addressing levels 3, 4 and 5. 7 bits are read from the input. If the value of 7 bits is less than 70, an element in Set 1 is chosen. As all the elements in Set 1 requires 18 bits at level 3, $R_3+R_5$=25 bits is satisfied.

If the value of 7 bits is greater than or equal to 70, another bit is extracted from the input and the value of 8 bits is compared to 248. If the value of 8 bits is less than 248 an element in Set 2 is chosen. If not, one more bit is extracted from the input and an element in Set 3 is chosen based on the value of 9 bits. As a result, we end up with an algorithm which maps fixed number of input bits to 16 rings for a frame.

For further clarity, the explanation of the above example is presented in the following in a different way. Assuming 16 shells in 2-D sub-spaces, there are 16×16=256 elements in the Cartesian product of the 2-D sub-constellations in 4-D sub-spaces. The 4-D elements are ordered according to their average energy, and 16 subsequent elements are merged into a 4-D shell. This results in 16 shells of equal cardinality in the 4-D sub-spaces. Again, the Cartesian product of the 4-D shells (resulting in 256 elements in each 8-D sub-space) are ordered according to their average energy and subsequent elements are merged into 8-D shells. To reduce the addressing complexity, the merging at this stage is achieved using non-equal number of elements in subsequent 8-D shells. In specific, the number of elements (in the order of increasing average energy) merged into subsequent 8-D shells are equal to {16, 16, 32, 32, 32, 32, 32, 64}, respectively. This results in 8 shells in 8-D sub-spaces. Following that, we obtain 64 elements in the 16-D sub-spaces (which are not merged) and 4096 elements in the 32-D space (which are not merged). Note that the cardinalities of the 16-D and 32-D elements are not equal (these cardinalities are all an integer power of two). The final constellation is selected from the 32-D elements of least energy such that the overall bit rate is 57. Note that without shaping, the bit rate would be 16×4=64. This means that the shaping redundancy is equal to 7 bits/32-D, resulting in,

CER=$16/(2^{57/16})$~1.35

The addressing at the highest level of the hierarchy is achieved using a Huffman tree as shown in FIG. 7B, 7C. The first step is decide if the selected 32-D element belongs to Set I, Set II or Set III. This is achieved by assuming that the 194 elements are labeled by the binary number obtained by assigning zero to the left branch and one to the right branch at each node of the tree. Then, the label of each final node (corresponding to a element) is obtained by concatenating the binary labels of its branches (where the most significant bits correspond to values closer to the top of the tree). This will result in the labels of the final nodes to be ordered increasingly from left to right. Note that the label of the final nodes are composed of 7 bits (for Set I), 8 bits (for Set II), and 9 bits (for Set III). In this case, to select a 32-D element, we extract 7 bits from the input stream and compare its numerical value with the threshold T1 which is the label of the last element in Set I. If the label is smaller or equal to T1, then we are within Set I, and will have another 57−7=50 bits to proceed with the addressing within the selected element. Otherwise, we extract one more bit from the input stream, resulting in an 8 bit label. We compare the numerical value of the resulting 8-bit label with the threshold value T2 which is the label of the last node in Set II. Again, if the label turns out to be smaller or equal, we proceed with the addressing within Set II using the remaining bits (in this case, 49 bits are left). If the label turns out to be larger than T2, then we extract one more it from the input stream and use the resulting 9 bits to select an element within Set III (in this case, we are left with 48 bits to select an element within Set III).

After selecting one of the 194 elements in 32-D (as explained above), to proceed with the addressing within the selected element, a look-up table is provided with 194 memory locations each of 4×3=12 bits, where the 3-bit address sections point to the 8-D shells building a given 32-D element (note that each 32-D element is simply the Cartesian product of four 8-D shells). This results in 194× 12=2328 bits of ROM.

To proceed with the addressing within 8-D shells, we note that the selected 8-D shell is composed of 16, 32, or 64 of 8-D elements (corresponding to 4, 5, 6 bits, respectively). In this case, we extract another 4, 3 or 2 bits from the input (for each 8-D sub-space) to bring the total number of bits per 8-D to 8 bits. We use these 8-bit addresses to select an 8-D element in each 8-D sub-space. To do this, a look-up table is provided with 256 memory locations each of 4×2=8 bits, where each 4-bit section of these 8-bit addresses points to the 4-D shells constructing a given 8-D element. These bits are used to select one 4-D shell in each 4-D sub-space.

To proceed with the addressing within 4-D shells, a look up table is provided of 256 memory locations each of 4×2=8 a bits, where each 4-bit section of these 8-bit addresses points to the 2-D shells construing a given 4-D element. These bits are used to select one 2-D shell in each 2-D sub-space. As mentioned before, there will be another group of input bits (depending on the number of signal points within each 2-D shell) which will be used to select the finally point within each 2-D sub-constellation. This finalizes the addressing.

The total memory requirement for the proposed addressing scheme is equal to:

$$M_{total}=2328+2048+2048=6424 \text{ bits}-0.73 \text{ K}$$

Note that the elements in the Cartesian product always happen in pair (of equal energy), say A×B and B×A, unless the two constituent lower dimensional components are the same, say A×A. This property can be used to reduce the size of the required memory by a factor of close to two at the price of a very small number of comparisons (comparing the labels to some anchor points corresponding to the label of the elements with identical components). Simulation results show that the proposed constellation offer a shaping gain of about 1 dB.

As a specific example, assume that each 2D sub-constellation is composed of 256 points divided into 16 shells each of 16 points. The input is composed of a total of 57 shaping bits plus another 64 bits. The 57 shaping bits are involved in the selection of 2-D shells through the proposed addressing scheme and will be used to select a unique 2-D shell in each 2-D sub-constellation. The remaining 64 bits will be divided into 16 parts each of 4 bits and each of these 4 bits will be later used to select a unique point among the choices available in each of the chosen 2-D shells. We are only concerned with the operation of the selection of the 2-D shells using the 57 shaping bits. The selection of the final 2-D points within those 2-D shells is a trivial task. The same procedure will apply to any other scenario where the number of 2-D points is different from 256 while the number of 2-D shells is 16. For example, if the 2-D sub-constellations are composed of 64 points, we would have 16 of the 2-D shells each with 4 points and the total number of input bits would be 57 (for shaping) plus 32 bits for the selection of the final 2-D points (the addressing procedure for those 57 shaping bits would be exactly the same for all such cases of scaling the 2-D sub-constellations) In the following, we assume that the 2-D sub-constellations are composed of 256 points. There are 57+64=121 input bits and we select the first 57 of those for the addressing (shaping bits). Let us consider the following cases for the 57 shaping bits:

Case I: <u>0010010</u>

The first 7 bits are 0010010 with the value of 18 that is less than T1=69. In this case, the selection will be within Set I in FIG. 7C. This value of 18 will point to a location in the corresponding look up table which contains 4 pointers each of 3 bits specifying the related 8-D elements (there are 4 of these 8-D elements). After knowing the 8-D elements, we proceed with the addressing within each of those 8-D elements by extracting an appropriate number of bits from the remaining input bits in a sequential manner and using those bits to select their related elements within the 4-D and subsequently 2-D sub-spaces by referring to the related look-up tables used for the addressing within 4-D and 2-D sub-spaces.

Case II: <u>1010010</u> <u>0</u> 100100

The first 7 bits are 1010010 which is equal to 82 and is greater than T1=69. To proceed, we extract one more bit from the input which is equal to 0. Then, the first 8 bits, namely, 10100100 with the value of 164 is compared to T2=247. As the label is smaller than T2, then we are within the Set II. In this case, we are left with 49 shaping bits to proceed with the selection of the 8-D elements.

Case III: <u>1111011</u> <u>1</u> 100100

The first 7 bits are 1111011 with the value 123 which is larger than 69 and the first 8 bits, namely 11110111 are of value 247, so we are within Set II and we use the first 8 bits for the addressing in Set II.

Case IV: <u>1111110</u> <u>1</u> 100100

The value of the first 7 bits is larger than T1=69 and the value of the first 8 bits is larger than T2=247, so we are with Set III and we extract the first 9 bits for the addressing with Set III.

Fixed Tree

An example of a fixed tree implementation will now be given. A fixed tree refers to the situation where the merging of elements at all levels of hierarchy is achieved in a uniform manner (equal number of elements are merged into shells). This results in a higher memory size while smaller number of computations are needed to search the corresponding memory lookup tables. The Fixed tree has the same structure as the Huffman tree for level 1 and level 2 Level 3 is made up of 4 blocks. Two adjacent level 2 blocks are combined to form one level 3 block. Each element in a level 3 block has pointers to two shells in different blocks at level 2. As at level 2, each block has 16 shells, there are 256 possible different combinations of level 2 shells, so each level 3 block has 256 elements. 256 elements are sorted according to their energy and grouped into 16 shells each with 16 elements.

Level 4 is made up of 2 blocks, where two adjacent level 3 blocks are combined to form one level 4 block. Each element at level 4 block has pointers to two shells in different blocks at level 3. As at level 3, each block has 16 shells, there are 256 possible different combinations of level 3 shells, so each level 4 block has 256 elements. 256 elements are sorted according to their energy and grouped into 128 shells each with 2 elements.

Level 5 is made up of a single block, which is formed by the two level 4 blocks. Each element at level 5 block has pointers to two elements in different blocks at level 4. As at level 4, each block has 128 shells, there are 16384 possible different combinations of level 4 shells, so the level 5 block has 16384 elements. Elements are sorted at level 5 according to their energy without doing any grouping.

From an input of 89 bits, the first 7 bits are used to select an element at level 5. As 7 bits can choose 128 different elements, at level 5 only first 128 elements are used. Each element at level 5 points to two shells at level 4. At level 4 an element needs to be selected in each shell to go down to level 3. For each block at level 4, 1 bit is read from the input to select one of 2 elements in a shell. The selected element at level 4 points to two shells at level 3 where each shell has 16 elements. For each block at level 3, 4 bits are read from the input to select one of 16 elements at level 3. The selected element at level 3 points to two shells at level 2 where each shell has 16 elements. Again, for each level 2 block, 4 bits are read from the input to select one of 16 elements at level 2. The selected element at level 2 points to two rings at level 1 where each ring has 4 points. For each block at level 1, 2 bits are read from the input to select one of 4 points in a ring at level 1.

The total number of bits read from the input at each level is as follows. 7 bits at level 5, 2*1=2 bits at level 4, 4*4=16 bits at level 3, 8*4=32 bits at level 2 and 16*2=32 bits at level 1 which gives a total of 89 bits.

Different Fixed tree structures are possible. Table 2 shows a different one, which has 4 rings at level 1.

TABLE 2

Two possible Fixed tree structures

| | Fixed Tree Structure 1 | | | Fixed Tree Structure 2 | | |
|---|---|---|---|---|---|---|
| # of shells | # of points in each shell | # of bits read | # of shells | # of points in each shell. | # of bits read |
| Level 1 | 16 | 4 | 2 × 16 = 32 | 4 | 16 | 4 × 16 = 64 |
| Level 2 | 16 | 16 | 4 × 8 = 32 | 16 | 1 | 0 × 8 = 0 |
| Level 3 | 16 | 16 | 4 × 4 = 16 | 16 | 16 | 4 × 4 = 16 |
| Level 4 | 128 | 2 | 1 × 2 = 2 | 128 | 2 | 1 × 2 = 2 |
| Level 5 | 16384 | 1 | 7 × 1 = 7 | 16384 | 1 | 7 × 1 = 7 |

PAPR Reduction Algorithm

The previously described PAPR algorithm can now be adapted for use with the above described constellation shaping algorithms. Referring again to FIG. 5, the output of each constellation-shaping algorithm 502,504 is a 32-D vector generated from B bits In this embodiment, these B bits consist of B-1 data bits taken from the input bit stream, and one dummy bit 508 selected by the PAPR algorithm 506.

As the dummy bit is either 0 or 1, addressing of B bits is performed by the constellation shaping algorithms 502,504 twice, corresponding to dummy bit being equal to 0 or 1. This yields two choices for each 32-D vector. For an OFDM system, which uses N tones, the input to the modulator is generated by concatenating J 32-D vectors such that J*16=N as each carrier transmits a 2-D point. For each of J 32-D vectors, we can choose one from a set of 2, so 2N-D vector can be generated in $2^J$ different ways depending on the values of dummy bits. Thus, the purpose of the PAPR reduction algorithm 506 in this context is to choose the 2N-D vector from a set of $2^J$ vectors, which yields the lowest peak magnitude after modulation. In general, $2^J$ is a large number which makes exhaustive search prohibitive due to its high computational complexity.

These two choices per constellation are analogous to the multiple choices (9) per constellation discussed with reference to FIG. 2. In this example, one dummy bits are employed resulting in two choices per constellation. More generally, a larger number of dummy bits may be employed resulting in a larger number of choices. However, this requires a larger search to find the particular permutation with the lowest peak power.

In one embodiment, an iterative search algorithm is employed to select between the two choices for each of J 32-D vectors. Initially the value of the dummy bit for each 32-D vector is set such that 2N-D vector has the lowest energy. Note that the lowest energy property does not imply that after modulation the lowest peak magnitude will result. Next, starting from the first 32-D vector, the value of dummy bit is flipped, (i.e. select the other choice for the first 32-D vector), while keeping the values of other dummy bits as before. Modulation is performed, and the peak magnitude calculated. The new value of the dummy bit is kept if there is a reduction in the peak magnitude and rejected otherwise. This procedure is repeated for all J 32-D vectors for several iterations.

In one embodiment, an iterative search algorithm is employed to select between the two choices for each of J 32-D vectors. Initially the value of the dummy bit for each 32-D vector is set such hat 2N-D vector has the lowest energy. Next, starting from the first 32-D vector, the value of each dummy bit is selected with the objective of reducing the impact of the error signal caused by the clipping or other forms of nonlinear amplification (caused by the large peak signal values). An example is to use an orthogonal projection method in an attempt to minimize the energy of such an error signal. In this case, noting that IFFT dimensions are divided into orthogonal subspaces (corresponding to different 32-D constellations), then the selection based on orthogonal projections in these orthogonal sup-spaces can be carried out independent of each other (reducing the search complexity).

The iterative search algorithm is not optimal because there is no guarantee that the obtained result gives the global minimum for the peak magnitude. Starting from a different initial condition or performing the search algorithm in a different way in general will yield a different result. A way to improve the performance of the algorithm is to obtain multiple solutions by starting from the same initial condition but changing the search pattern. A first solution can be obtained by starting from the first 32-D vector and changing the dummy bit for the first, second, third etc. 32-D vector. Another solution can be obtained by starting from the J-$1^{th}$ 32-D vector and move in a descending way, i.e. by changing the dummy bit for the J-$1^{th}$, J-$2^{th}$ etc. 32-D vector. Different search patterns can be employed which come up with different solutions. Finally, the solution is selected which gives the least peak magnitude out of the obtained ones.

Results

Simulation results have been obtained for N=1024 carriers where each carrier transmits a point from a 64 QAM. Simulation results have been obtained by transmitting $10^5$ OFDM symbols. For each symbol, the sample is stored which has the largest peak magnitude and the power of the OFDM symbol. Peak to average power ratio is obtained by dividing the peak magnitudes by the average power of all OFDM symbols. PAPR results are plotted by calculating the occurrence of symbols with a PAPR larger than a given PAPR.

Figure 8:
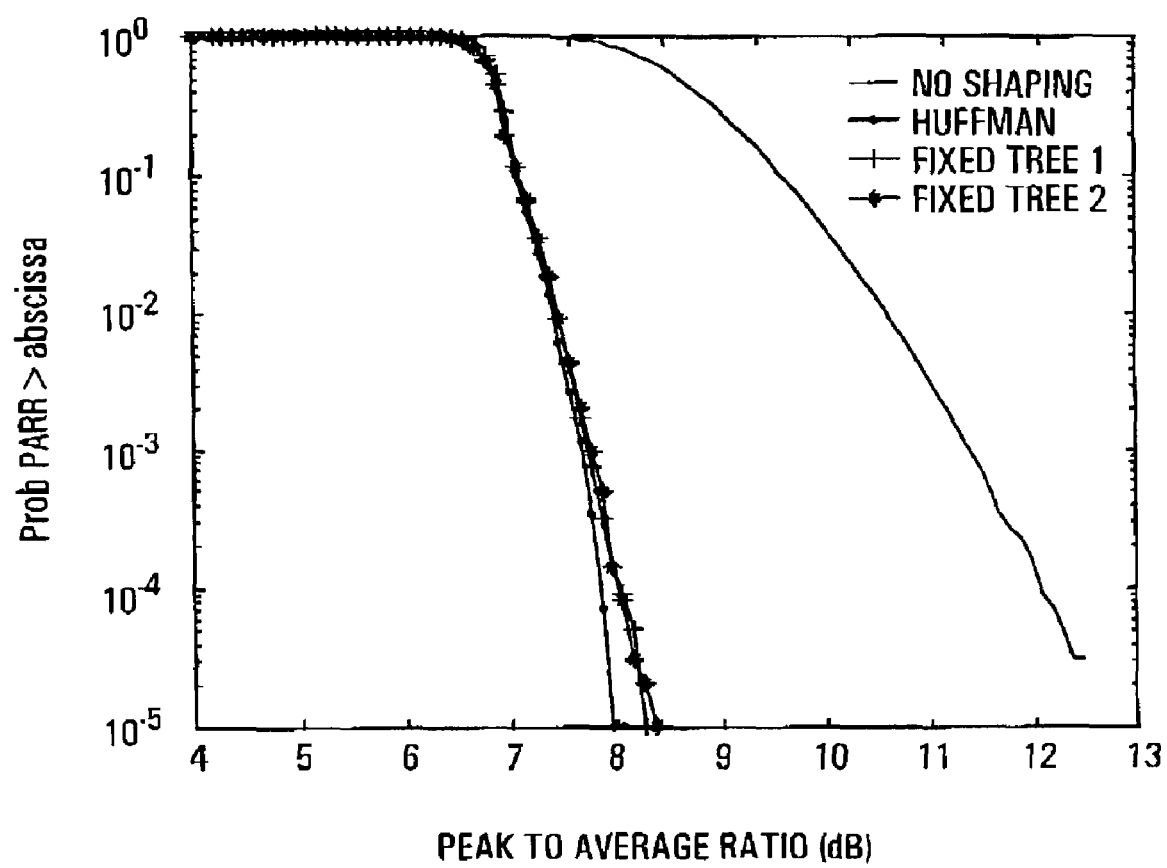
FIGS. 8, 9 and 10 are plots of performance results for the system of FIG. 5 with various constellation-shaping algorithms employed.
Figure 9:
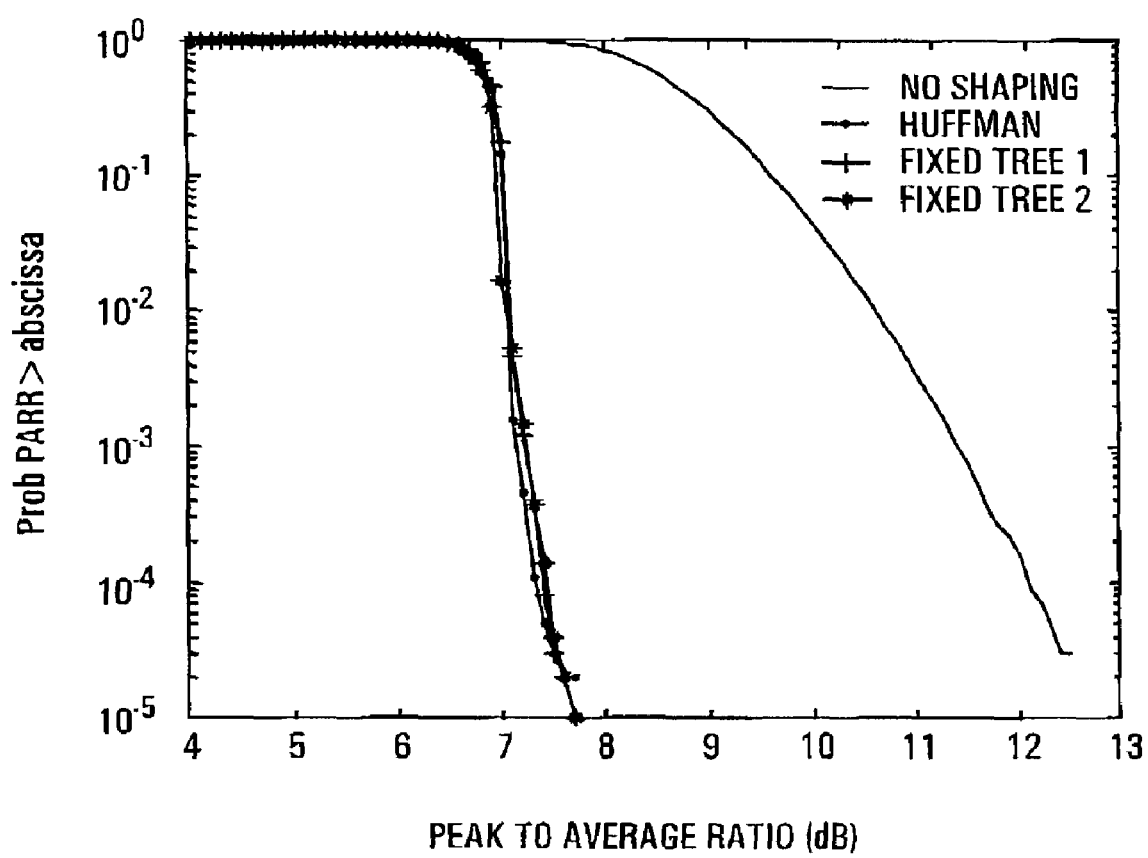

For the constellation-shaping algorithms, one dummy bit and 88 data bits are transmitted per 16 carriers, i.e. R-88+1=89. The results are plotted for both the Huffman tree and fixed tree structures. For the fixed tree, the two structures given in Table 2 are used. In FIG. 8, the PAPR is plotted with and without the constellation-shaping algorithm. The number of iterations is set to 12 and only a single solution is obtained. In FIG. 9, the number of iterations is set to 3 and four solutions are obtained in the iterative search algorithm and the best of the four is used.

For the results obtained, additional iterations and searching for another solution are not performed if PAPR is less than 7 dB for the OFDM symbol for some combinations of dummy bits. The number of IDFTs used in the iterative search algorithm is given by (number of solutions)×(number_of_iterations) and thus it is the same for the results plotted in FIGS. 8 and 9.

From the figures, it is observed that the tree structure used in the constellation-shaping algorithm effects the results slightly. Using an iterative search algorithm, the simulation which obtains one solution yields a PAPR of 7.9 dB at $10^{-4}$ and the simulation which obtains four solutions yields a PAPR of 7.4 dB at $10^{-4}$. Thus increasing the number of obtained solutions improves the performance of the PAPR algorithm somewhat.

Simulation results were also obtained for another variation of the shaping algorithm, which groups 8 carriers instead of 16. A fixed tree structure is employed with 4 levels where the tree structure is given in Table 3. Levels 1,2,3 and 4 are made up of 8,4,2 and 1 blocks respectively.

TABLE 3

Fixed Tree Structure 3

| | Fixed Tree Structure 3 | | |
|---|---|---|---|
| | # of shells | # of points in each shell | # of bits read |
| Level 1 | 16 | 4 | 2 |
| Level 2 | 16 | 16 | 4 |
| Level 3 | 128 | 2 | 1 |
| Level 4 | 16384 | 1 | 11 |

In this case, the total number of bits sent by 8 carriers is 45, which is 5.625 bits per carrier, CER=$16/2^{K/8}$=1.30.

Figure 10:
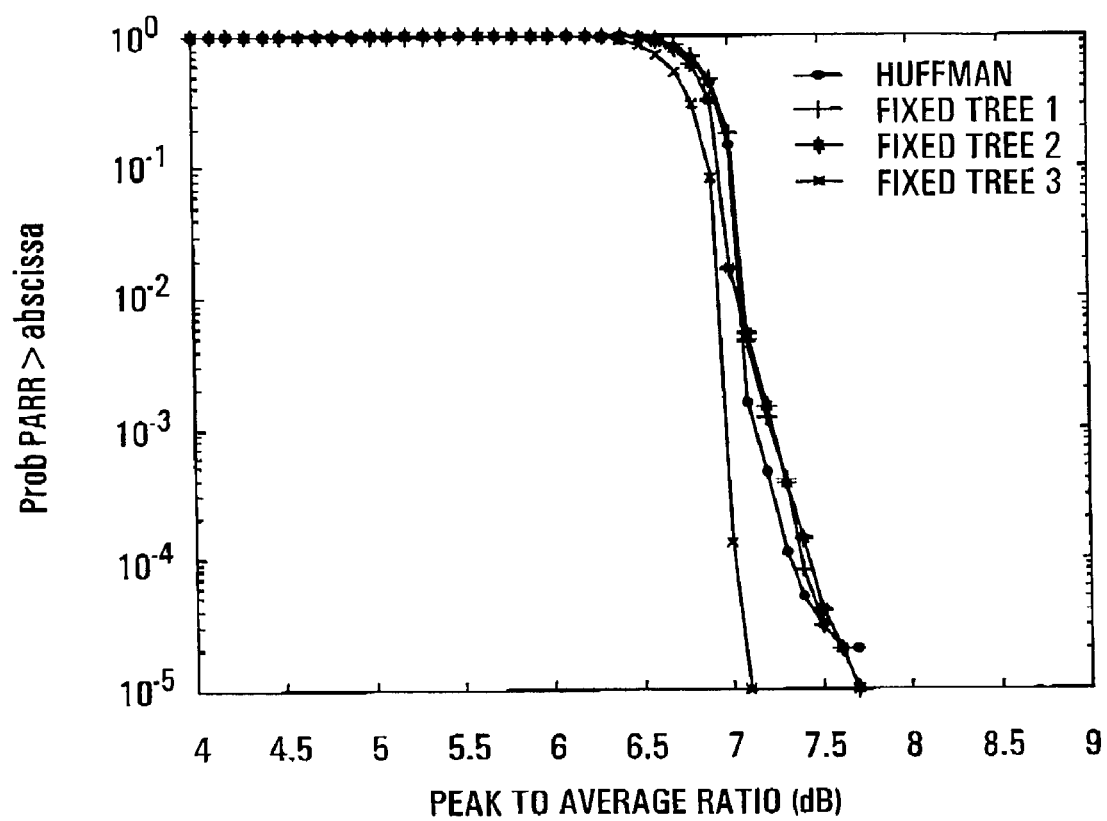

The results of different tree structures are given in FIG. 10. Fixed Tree structure 3 improved PAPR by 0.4 dB at symbol clipping probability $10^{-4}$.

The throughput of the algorithm is slightly higher (5.625 vs. 5.5625 bits per carrier) than the ones which groups 16 carriers. As the number of dummy bits per symbol is twice more than the tree structures which groups 16 carriers, the number of IDFTs used is twice as large in the iterative search algorithm. The complexity of addressing bits to rings is lower, since the tree structure is simpler.

Figure 11:
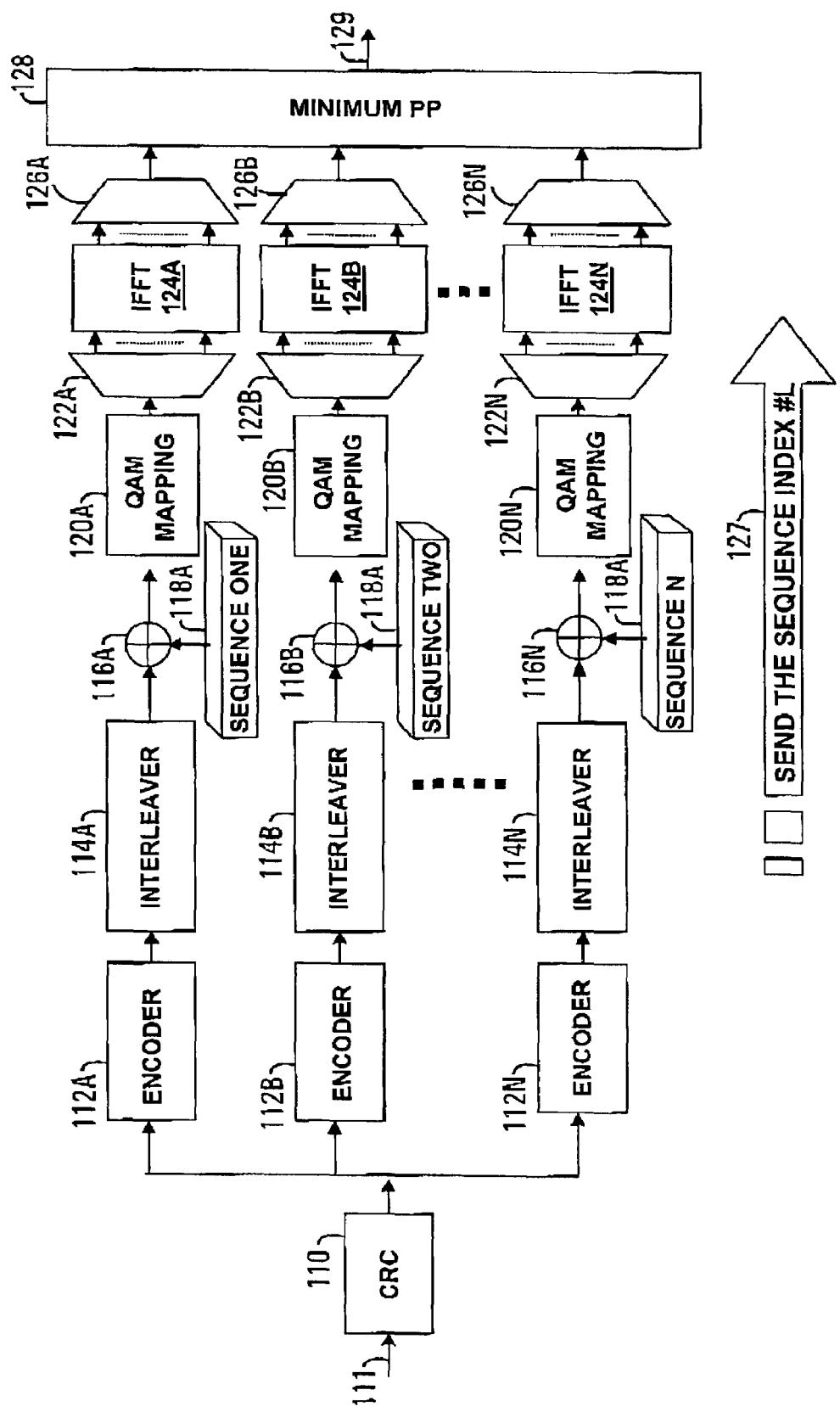
FIG. 11 is a block diagram of a conventional peak average power reduction apparatus.

Referring now to FIG. 11, shown is a block diagram of a conventional permutation based PAPR reduction system. An incoming bit stream indicated at 111 is modified to include a CRC (Cyclic Redundancy Check) computed by CRC block 110. The data plus CRC is then encoded in N different processing paths each beginning with a respective encoder. The first path is shown to include encoder 112A connected to interleaver 114A the output of which is connected to adder 116A which also has an input from sequence one generator 118A. The output of the adder 116A is fed to a QAM mapping block 120A. The output of the QAM mapping is fed to de-multiplexer 122A. The output of the de-multiplexer 122A is fed to an IFFT (Inverse Fast Fourier Transform) block 124A. The output of the IFFT 124A is fed to a multiplexer 126A. The output of multiplexer 126A is the signal generated by the first processing path, and this is fed to the minimum peak power (PP) block 128. FIG. 11 shows similar circuitry for each of N processing paths such that N different signals are input to the minimum PP block 128. Each processing path is identical except for the fact that a different sequence is input to each adder for combination with the output of the respective interleaver.

The minimum PP block 128 then simply examines the peak power of each of the N signals, and selects the one having the minimum peak power for transmission as output signal 129. Also indicated in FIG. 11 is a side information channel indicated at 127 which is used to send the sequence index number to the receiver so that the receiver can perform the proper de-permutation of the received signal. For example, if during a given processing instant the signal which is generated by using sequence two generators (118B), then the sequence index would indicate two, and this would be sent on the side information channel 127 to the receiver. It is this side information which occupies additional bandwidth and power over that of the raw transmit signal. While the channel which is selected is the one with the minimum peak power, this inevitably translates into a reduced peak average power (PAP), and it is usually the PAP reduction which is quantified when measuring the performance of such systems/methods, hence they have come to be called PAPR (peak to average power ratio) reduction systems/methods.

Figure 12:
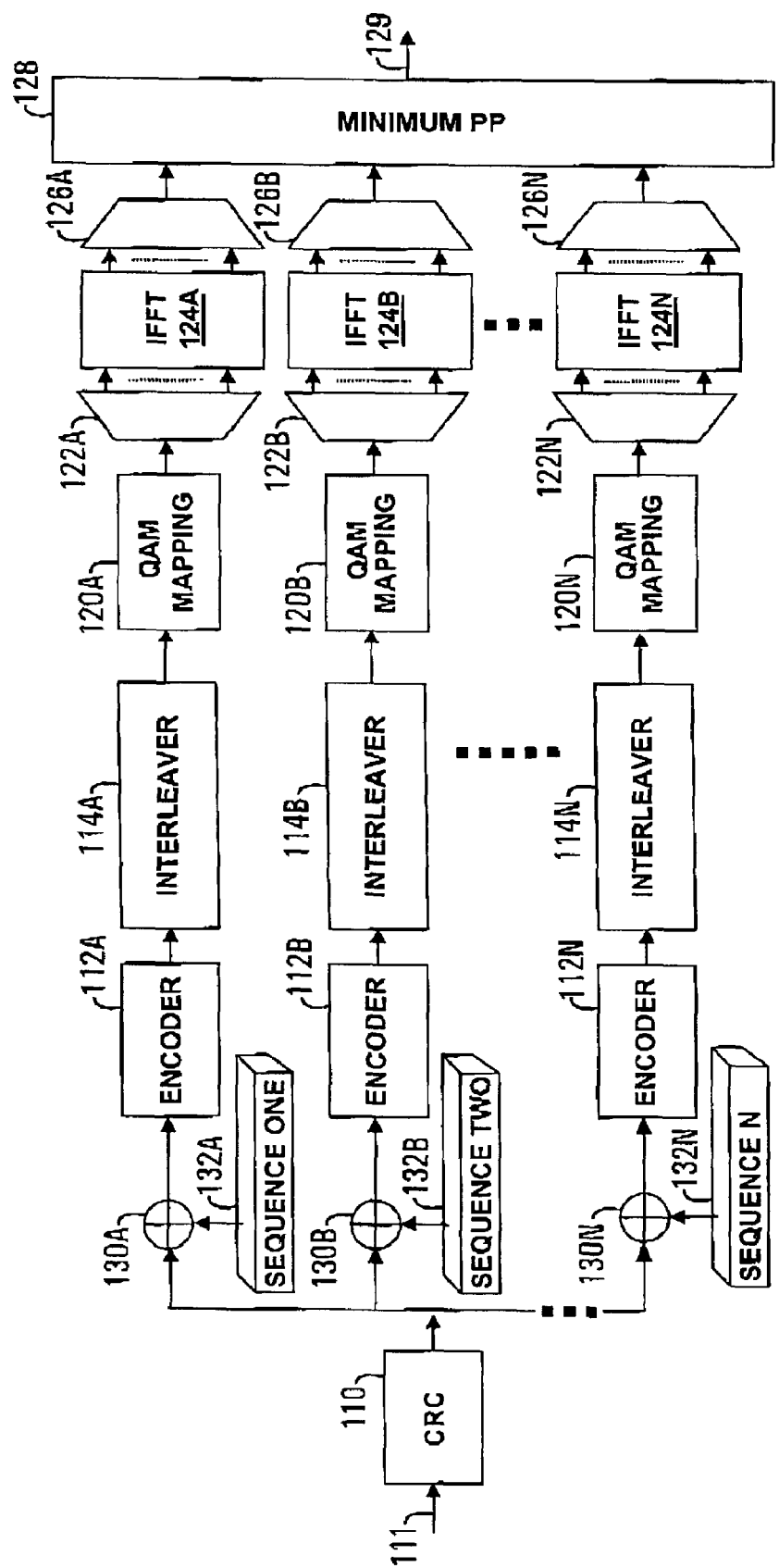
FIG. 12 is a block diagram of a peak average power reduction apparatus provided by an embodiment of the invention.

Referring now to FIG. 12, shown is a block diagram of an encoder featuring peak-to-average power reduction, in accordance with an embodiment of the invention. The elements of FIG. 12 which are in common with FIG. 11 are labelled identically. Again there is a CRC block 110, and N processing paths each containing an encoder, interleaver, QAM mapping, de-multiplexer, IFFT block, multiplexer, with the output of all of the multiplexers being connected to a minimum PP block 128. However, in this embodiment, the adder 116A and sequence one generator 118A of FIG. 11 are not shown between the interleaver and QAM mapping of the first processing channel, or for any processing channel for that matter. Rather, between the CRC block 110 and each encoder is a respective adder and sequence generator. Thus the first processing path has adder 130A and sequence one generator 132A, and the adder is connected to receive the signal after the addition of the CRC by block 110, and prior to encoding in encoder 112A The same is true for each of the other processing paths. It is noted that the added CRC bits at the transmitter have the property that if the entire block (data bits plus added CRC bits) pass through a corresponding CRC checker, the resulting output in the absence of any scrambling (called syndrome) will be zero.

As will be seen in the below discussion of the decoder, moving the scrambling step to prior to encoding and interleaving results in the ability at the decoder to perform decoding without a dedicated side information channel (channel 127 of FIG. 11) providing to the receiver an identification of the sequence number actually used. It is noted that in a practical implementation it may not be necessary to provide N different sequence generators. A set of sequences can be generated by combining a number of base masks. For example, with four base masks, 16 different scrambling sequences can be generated using all linear combinations of the four base masks. Thus, four mask generators together with logic to generate the 16 combinations may be used. More generally, a scrambling sequence needs to be provided for each path and this can be generated in any suitable manner.

Figure 13:
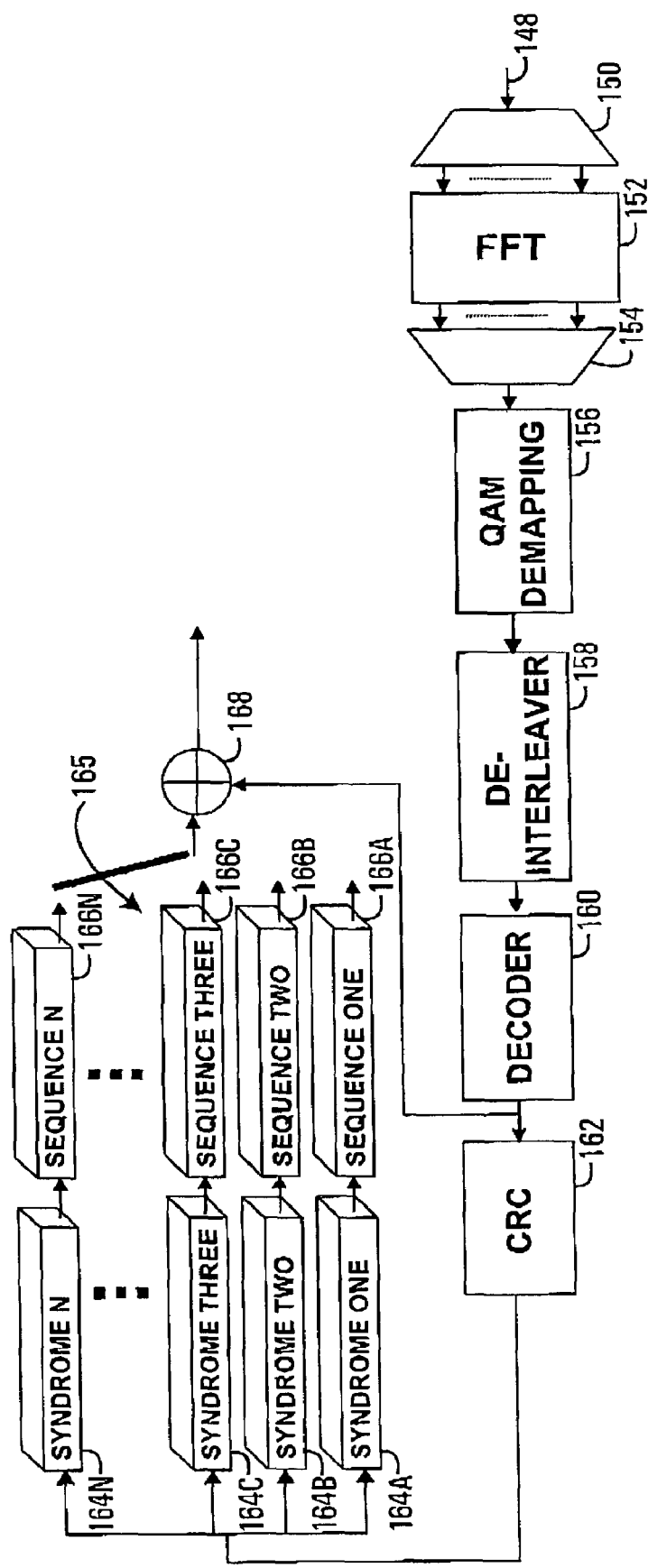
FIG. 13 is a block diagram of an example receiver used to process a signal generated by the system of FIG. 12.

Referring now to FIG. 13, shown is an example implementation of a decoder provided by an embodiment of the invention which is adapted to decode a signal transmitted with encoding such as shown in FIG. 12 without the necessity of receiving side information to identify the particular permutation sequence used.

The decoder receives a received signal 148 which passes to de-multiplexer 150, Fast Fourier Transform (FFT) block 152, multiplexer 154, a QAM demapping block 156, a de-interleaver 158, and a decoder 160. It can be seen that all of these blocks are simply the inverse blocks of those in the transmit processing path of FIG. 12. The output of the decoder is connected to two places. First, it is connected to a CRC checker 162, and secondly is connected to the input of an adder 168. The output of CRC checker 162 is connected to N processing paths each having a respective syndrome number and a respective sequence generator. Thus, for the first processing path, there is a syndrome number one 164A and sequence one generator 166A, and similar components are shown for each of the other processing paths. Any of the N processing paths is capable of being connected to the adder 168.

The processing of the received signal by blocks 150, 152, 154, 156, 158 and 160 is standard and will not be elaborated upon here.

The decoded sequence produced by decoder 160 is then passed through the CRC checker 162 which computes a CRC output. In a receiver for a conventional system, such as that shown in FIG. 11, the receiver would perform de-scrambling between the QAM demapper and the de-interleaver, and then the CRC checker would compute a CRC output which would either be correct (i.e. all zeros) or incorrect (i.e. non-zero) in which case the assumption is made that an error has occurred In contrast, in the receiver of FIG. 3, no de-scrambling has taken place yet, and as such the output of the CRC checker 162 will be a function of which scrambling sequence was used at the transmitter. Thus if there are N different scrambling sequences, there are N possible different CRC outputs produced by CRC checker 162. These N different CRC outputs are referred to as syndromes of the CRC output. There is a one-to-one mapping between the syndrome of the CRC, and the scrambling sequence used at the transmitter. Thus, at the receiver the CRC output 162 is compared to the N syndromes indicated at 164A through 164N. The matching syndrome is then mapped to the corresponding sequence that was used at the transmitter. Thus if the syndrome for sequence two is computed, then sequence two must have been used at the transmitter. In any case, the sequence number mapped to by the syndrome computed by the CRC checker 162 is selected for connection to the adder 168. Thus for example if syndrome number two is detected, then the output of sequence two generator 166B is connected to the adder 168. Then the scrambling is performed by simply adding the sequence to the decoder output.

In the case that the detected syndrome is NOT equal to any of the known syndromes, preferably a channel error is announced and re-transmission is requested. This is the role of error detection in its traditional sense which is here mixed with the scrambling for PAPR reduction.

Advantageously, since the scrambling of the CRC encoder output sequence will produce a syndrome at the CRC check performed at the receiver side, such a syndrome can be used as a unique index to identify the scrambling sequence applied at the transmitter, and such an index is not required to be transmitted to the receiver using any side information channel. A code book matching the syndrome to the various scrambling sequences is used at the received side. In the illustrated example this simply consists of the association of each syndrome with the corresponding sequence.

Advantageously, no bandwidth expansion is required in contrast to prior art methods. The benefits of the application of this is PAPR reduction method will increase as a function of an increased number of processing paths, and an increased number of sequences attempted at the transmitter. This of course translates into extra transmitter computation complexity, and as such a number needs to be selected which results in adequate PAPR reduction, but not extreme increase in complexity.

In some embodiments, the random sequence code book construction can be optimized to minimize the missed detection of a CRC error. Because N different results at the receiver all in fact translate to the same transmitted CRC, it can be seen that there may be some reduction in the quality of the CRC channel. By selecting the sequences so that there as far apart as possible, there is a smaller chance that an error will result in the shift from one syndrome to another syndrome. This is elaborated upon below in the discussion of FIGS. 20, 21 and 22.

Figure 14:
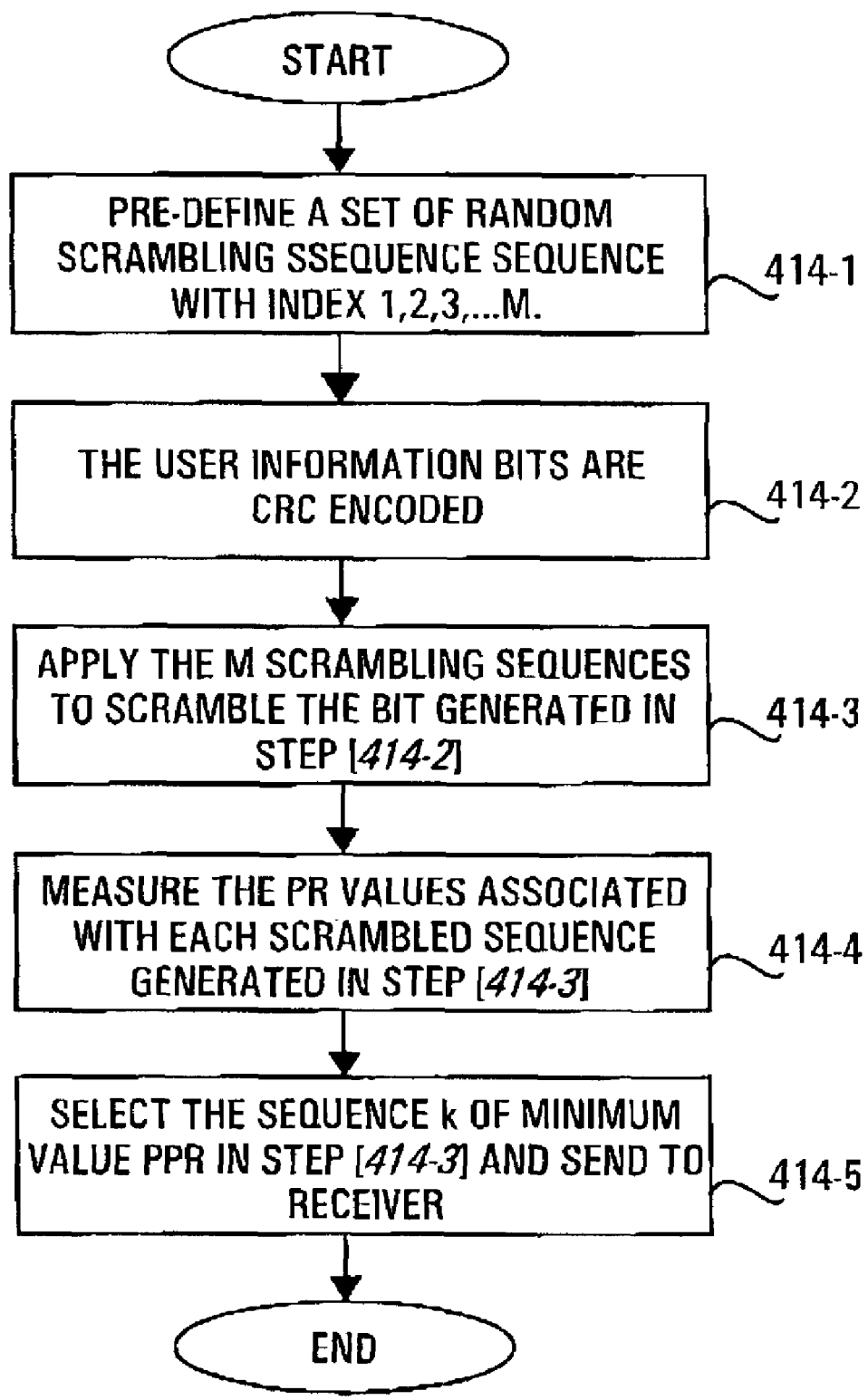
FIG. 14 is a flow chart of the processing carried out by the transmitter of FIG. 12 according to a preferred embodiment of the invention.

Referring now to FIG. 14, shown is a flow chart of the processing conducted at the transmitter/encoder. In step 414-1, a set of random scrambling sequences with index 1, 2, . . . , N is pre-defined. In step 414-2, the user information bits are CRC encoded. In step 414-3, the N scrambling sequences are each applied to scramble the bits generated in step 414-2. In step 414-4, the peak power value associated with the use of each scrambled sequence generated in step 414-3 is measured. In step 414-5, the sequence k having the minimum value PP in step 414-4 is selected and transmitted to the receiver.

Figure 15:
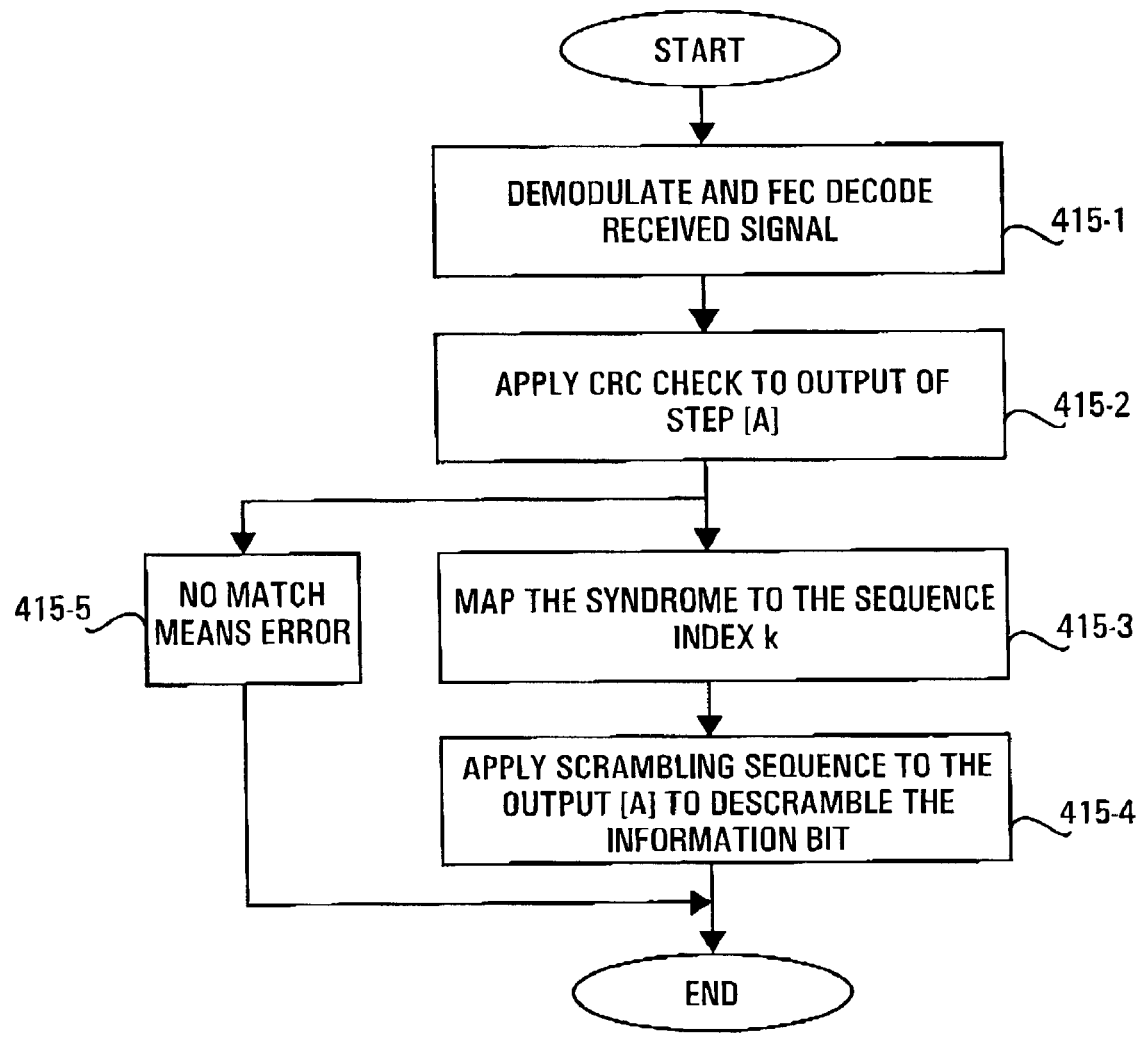
FIG. 15 is a flow chart of the processing performed by the receiver functionality of FIG. 13 according to a preferred embodiment of the invention.

FIG. 15 is a flow chart of the method conducted at the receiver to recover the information. In step 415-1, the signal is de-modulated and the signal is forward error correction decoded. In step 415-2, the CRC check is applied to the output of step 415-1. At step 415-3, the output determined in step 415-2 compared to the set of valid syndromes and if there is a match, it is mapped to the sequence index k. If there is no match (steps 414-5) then an error has occurred. Finally, at step 415-4, the scrambling sequence identified by sequence index k is applied to the output of the decoding step (step 415-1) to de-scramble the original information bits.

Figure 16:
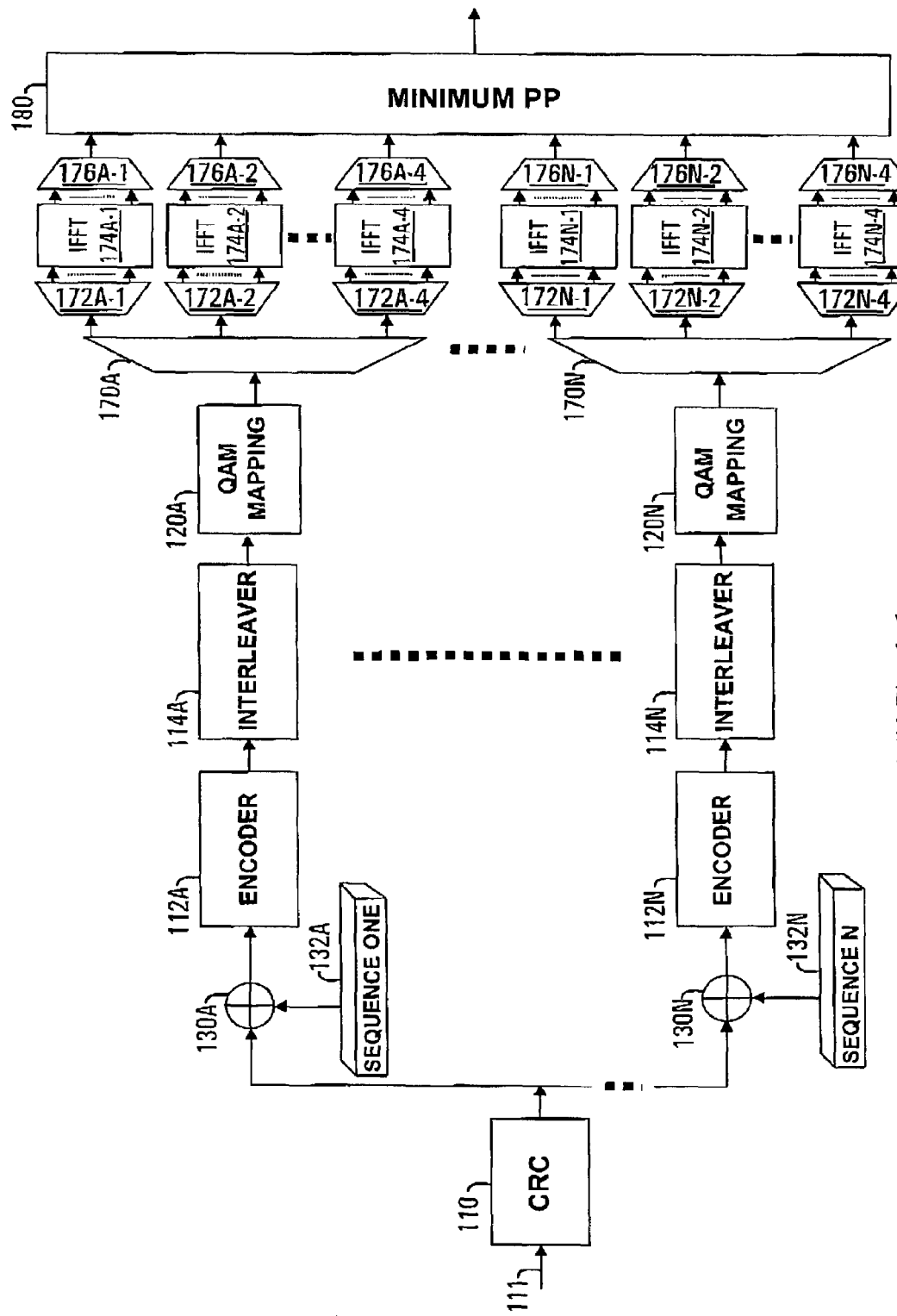
FIG. 16 is a block diagram of a peak average power reduction apparatus for application where the encoder blocks size is larger than the FFT size.

The above described embodiments have assumed that the encoder block size is the same as the size of the IFFT. In another embodiment, shown in block diagram form in FIG. 16 the method is applied to the case where the encoder block size is larger than the FFT size. FIG. 16 is similar to FIG. 12 in that there is a CRC block 110, and N parallel processing paths, each having a respective sequence number applied with an adder. Each parallel path also includes an encoder, interleaver, QAM mapping function as in FIG. 12. However, in this case since the block size is bigger than the FFT size, the output of the QAM mapping function is processed slightly differently. The functionality is the same however for each processing path and will be described by way of example with respect to the top processing path shown in FIG. 16. The output of QAM mapping 120A is fed to a first de-multiplexer 170A which splits the signal stream into a number of parallel paths, the number of parallel paths being determined by the IFFT block size. In the illustrated embodiment it is assumed that there are four parallel paths connected to the output of the multiplexer 170A. These four paths are connected to four de-multiplexers 172A-1 through 172A-4 each of which is connected to a respective IFFT blocks 174A-1 through 174A-4. The outputs of the IFFT blocks 174A-1 through 174A-4 are connected to multiplexers 176A-1 through 176A-4 and the outputs of the multiplexers is connected to the minimum PP block indicated at 180. The minimum PP block in this embodiment processes sets of IFFT outputs produced by respective parallel processing paths together. Thus, a single peak power is determined for the combination of outputs produced by multiplexer 17GA-1 through 176A-4 in the first parallel processing path, and a peak power is also determined for each other processing path, for example the combination of outputs produced by multiplexers 176N-1 through 176N-4 produced by the Nth parallel processing path. At this point the minimum PP block 180 selects the parallel processing path having the minimum peak power for transmission. The multiple outputs generated for the selected processing path can then be transmitted in sequence.

Figure 17:
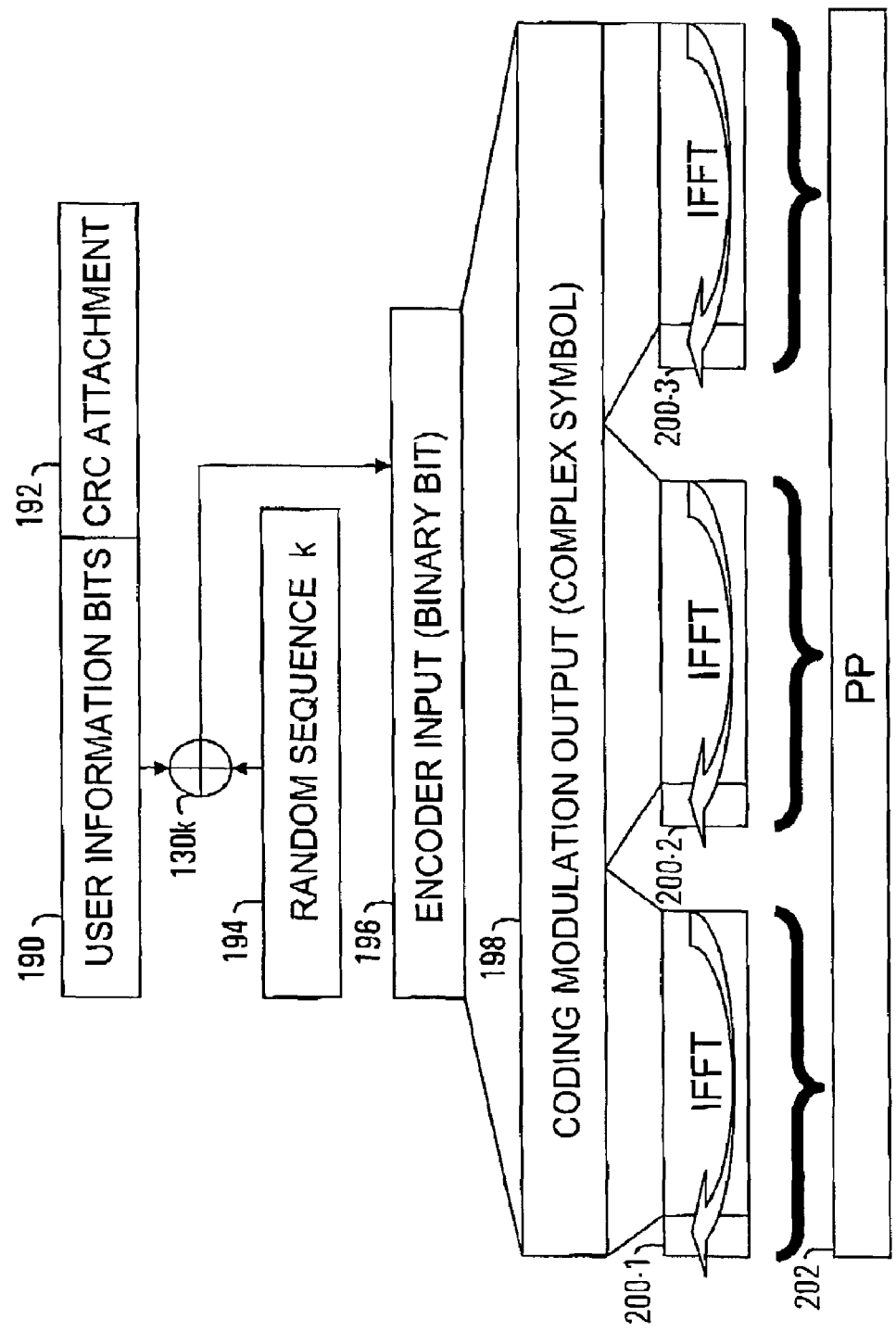
FIG. 17 illustrates the various signal states which exists for the embodiment of FIG. 16.

FIG. 17 shows the various signals which are generated by the system of FIG. 16. Shown initially are the user information bits indicated at 190 and the CRC attachment generated by the CRC block, generally indicated at 192. The random sequence applied in a given processing path, the kth path in the illustrated example is indicated at 194, and this is combined with adder 130k to produce the encoder input indicated at 196. The encoder input is encoded and modulated to produce the coding and modulation output 198 which is then processed by parallel IFFT functions for the path. The IFFT outputs are indicated at 200-1, 200-2 and 200-3, there being three IFFT blocks required for this example. Multiple such results would be produced, one for each sequence number. The PP result is indicated generally at 202.

Figure 18:
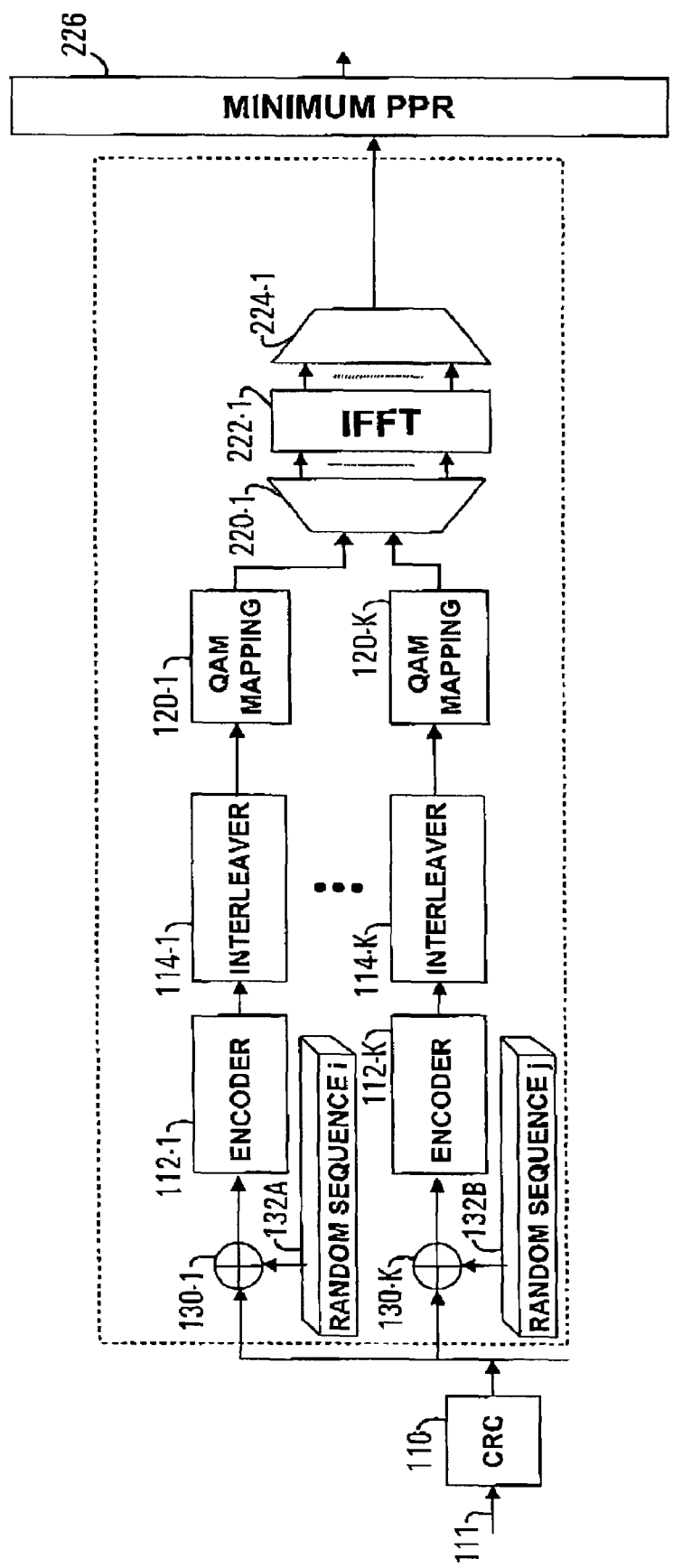
FIG. 18 is a block diagram of a peak average power reduction apparatus applicable where the encoder block size is smaller than the FFT size.

The above example has provided an implementation of the invention for systems in which the encoder block size is larger than the FFT size. Another embodiment of the invention provides a solution for applications in which the encoder block size is smaller than the FFT size. An example of this is shown in FIG. 18. FIG. 18 shows the transmitter side functionality which again shares many components in common with those of FIG. 12, and these components are identically numbered. In this case, rather than providing a respective de-multiplexer, IFFT, multiplexer path for each parallel processing path, the QAM mapping outputs of several processing paths are combined and processed by a single IFFT block. Thus in the illustrated example, the outputs of the K processing paths, namely the outputs of QAM mapping 120-1 through 120-K are input to a single de-multiplexer 220-1, processed by an IFFT block 222-1, the output of which is connected to a multiplexer 224-1 the output of which is connected to the minimum PP block 226.

Such processing is conducted for randomly selected sequences i, j, for multiple pairs of sequences until an acceptable peak power is detected. Alternatively, multiple parallel paths can be provided. A design consideration is how many different permutations to consider for the group of data blocks. If two user data blocks are combined for one IFFT, and there are 16 different available sequences, then there are 16×16=256 ways of applying these sequences to the two data blocks. This would require a significant amount of hardware. Likely a small number of permutations would be considered in a practical implementation.

Then, the minimum PP block 226 functions to select the processing path as before but in this case the selected path will be the result of a combination of K scrambling sequences applied to different portions of the overall content.

Figure 19:
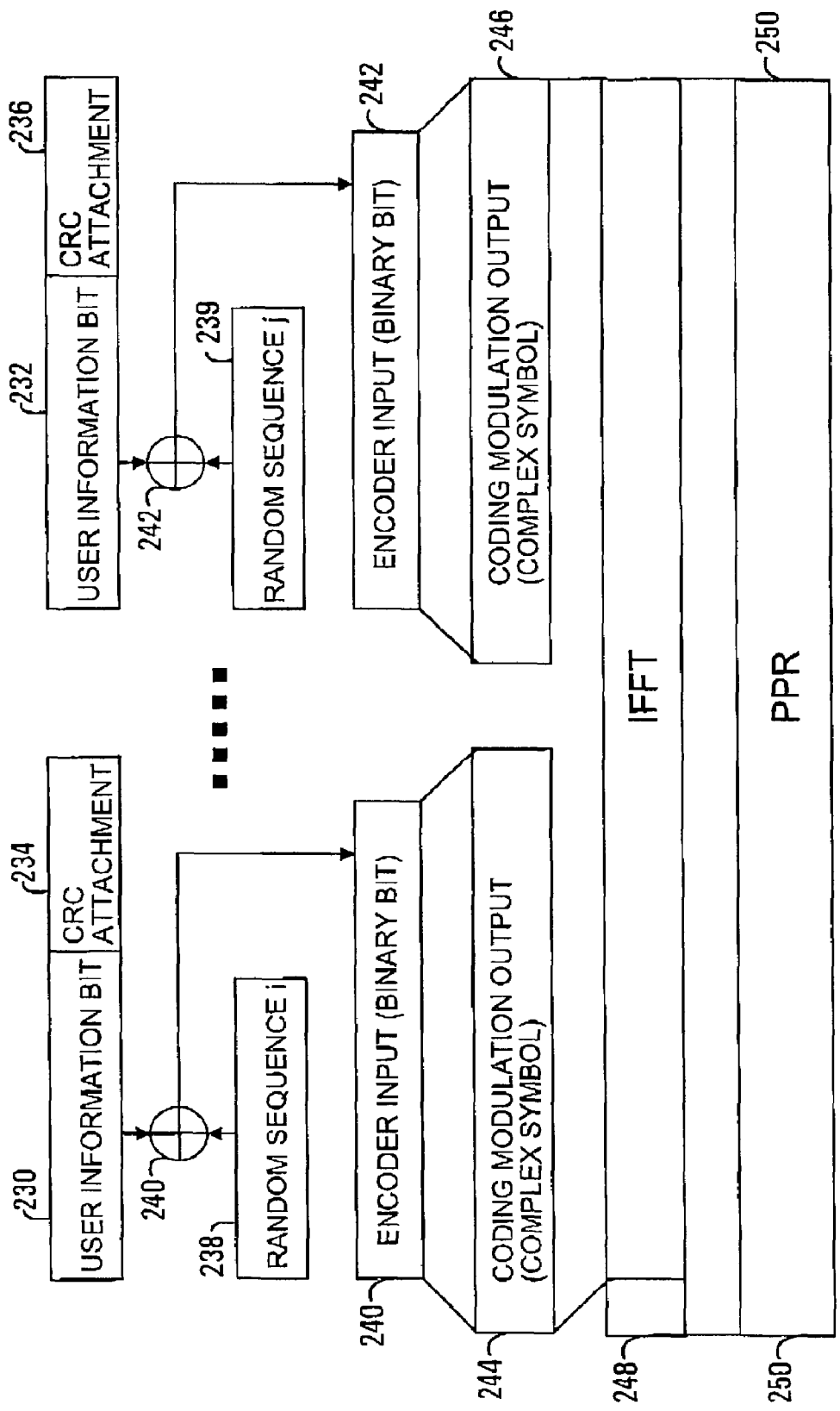
FIG. 19 shows the various data states generated by the system of FIG. 18.

FIG. 19 shows the various signals which apply for this example. In this case, there would be multiple sets of user information bits which end up being combined in the single output. In the illustrated example there are shown sets of user information bits 230 and 232 each with respective CRC attachments 234 and 236. Each of these are combined with a respective random sequence number i 238 and sequence number j 239 as indicated by respective adders 240, 242. This produces a pair of encoder inputs 240, 242 which in turn after coding and modulation produce a pair of coding modulation outputs 244, 246. If there were more than two parallel user information streams that are being combined, of course there would be a respective number of encoder inputs and coding modulation outputs. The coding modulation outputs 244, 246 are processed in parallel to produce a single IFFT block 248 the output of which is processed by the PP block to produce a PP result indicated at 250. Such a PP result will be produced for each set of combined parallel processing paths, and once again the set of combined parallel processing paths having the minimum PP is selected for transmission to the receiver.

The above-described embodiments have focused upon using the CRC syndrome to allow a determination at the receiver of which sequence number was used at the transmitter, the sequence having been selected in order to minimize the peak average power ratio. In another embodiment, rather than striving for minimum peak average power ratio, the same method can be applied solely for the purpose of transmitting additional information using the CRC. For example, if there are 16 possible sequences that can be used for scrambling at the transmitter, then an identification of a particular one of these sequences represents four bits of information. The method provided by the invention can be used to encode these four bits of information into a transmitted bit stream. In such a system, the four bits of information would be used to select which of these 16 sequences to scramble with, and the scrambled sequence is transmitted. Then, at the receiver, using the CRC syndrome detector, a determination of which sequence was used to scramble at the transmitter can be made, and accordingly a determination can be made of what the four bits transmitted were. This is a way of squeezing a little bit more bandwidth out of a system in which CRC is being employed. For example, in some systems in which an error interface is fully defined, it might be useful to find a way to transmit one or two signalling bits which have not been defined in the standard. This would provide a way of doing this without making any change whatsoever to the air interface standard.

The illustrated embodiments have all featured encoding, interleaving, QAM mapping and IFFT processing. It is of course to be understood that there may be many different contexts in which it will be useful to apply a number of different sequences to a bit stream, and then subsequently after further processing of the signal, examine the signal and determine the signal with the minimum peak average power ratio. The manner by which each of the possible signals is processed before minimum peak average power ratio determination is not essential to all embodiments of the invention. Thus, it is to be understood that the encoder, interleaver, QAM mapping, IFFT processing for example as shown in FIG. 2, could be replaced with other processing steps/functional blocks. of course similar comments apply to the receiver which will in many cases include inverse blocks paralleling those used at the transmitter.

The minimum distance of the linear codes can be found by calculating the smallest hamming weight of the nonzero code-words, which can be represented by the path in the trellis diagram of the code that has the minimum number of "ones". Thus, the minimum distance of the codeword can be determined by identifying the path with the smallest weight in the trellis diagram.

Figure 20:
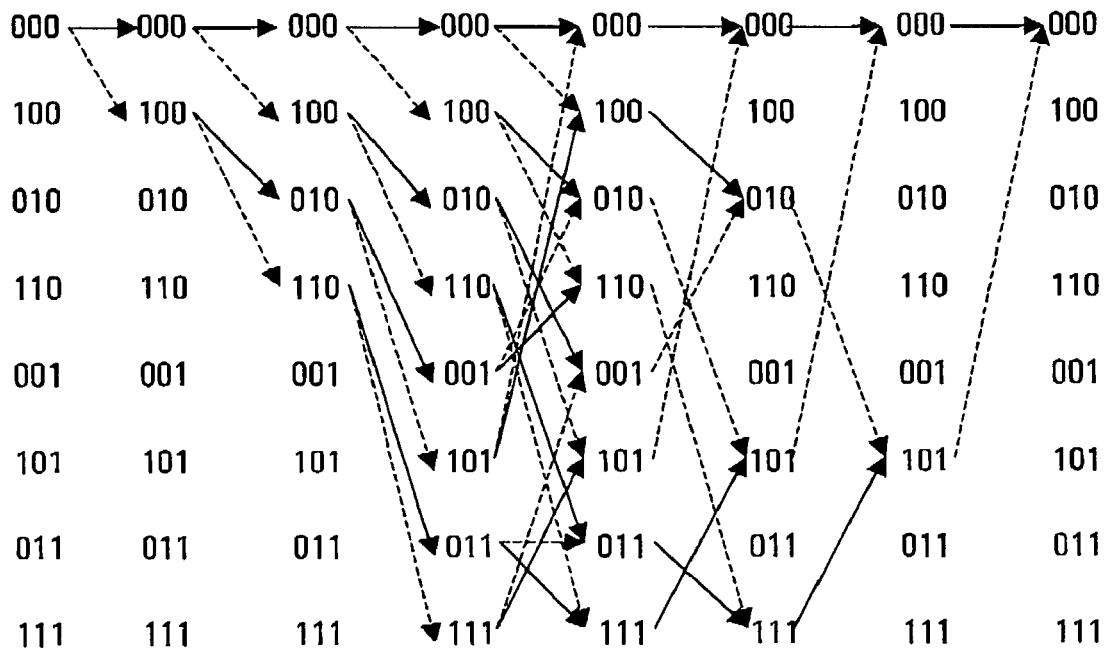
FIG. 20 is a Trellis diagram for a (7,3) Hamming code.
Figure 21:
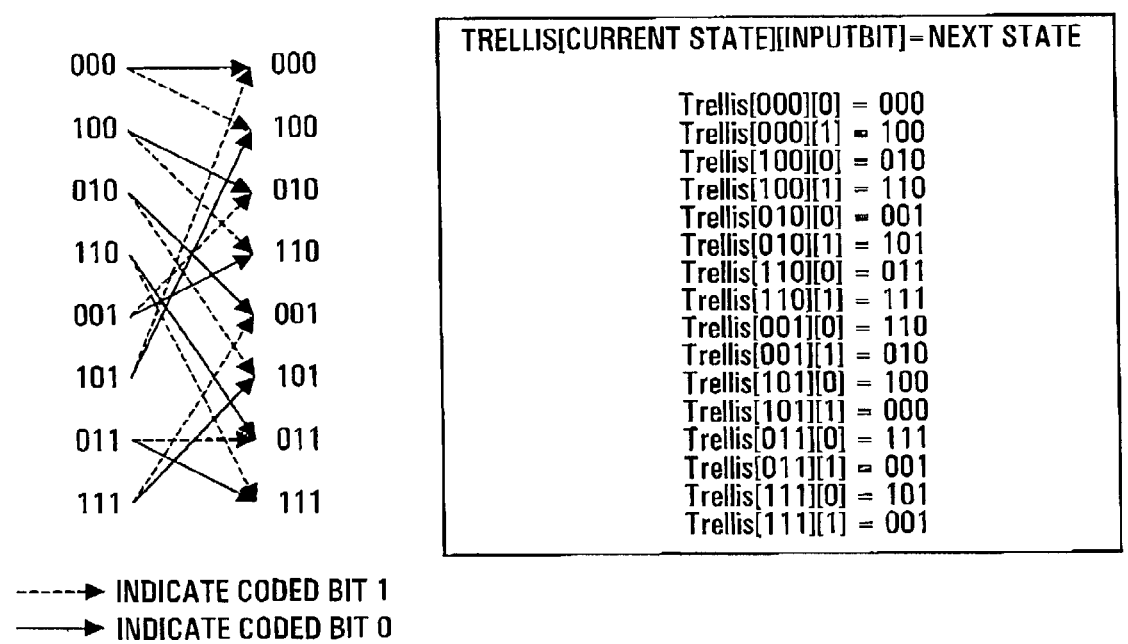
FIG. 21 shows the connectivity of partial syndromes for the code of FIG. 21.

In order to find the path representing the smallest hamming weight, one can build the trellis diagram of the code. The states in this trellis are the values of the partial syndrome and the branches correspond to the coded bits connecting one value of the partial syndrome to another. In the case of CRC, the partial syndromes correspond to the content of the shift register used to check the CRC. The trellis diagram shows how different states of partial syndrome are connected together to form valid codeword paths. An example of the trellis diagram of (7, 3) hamming code is shown in FIG. 20.

To be able to traverse the trellis diagram, the connectivity between the partial syndromes need to be calculated first, and stored in a look up table. Thus, when given the current state of the partial syndrome with an input bit, the next state of the partial syndrome can be determined quickly by the look up table. This is demonstrated in FIG. 21 for the example of FIG. 20.

Instead of calculating the weights of all possible codeword first and then determining the smallest hamming weight, it is more efficient to calculate the minimum weight as traversing the trellis diagram.

The algorithm finds out the smallest weight by repeating the process of accumulating the weight at each node in the trellis diagram. When there are two paths visiting the same node, the path that results in larger accumulated weight is eliminated. This is illustrated in FIG. 22.

Figure 22:
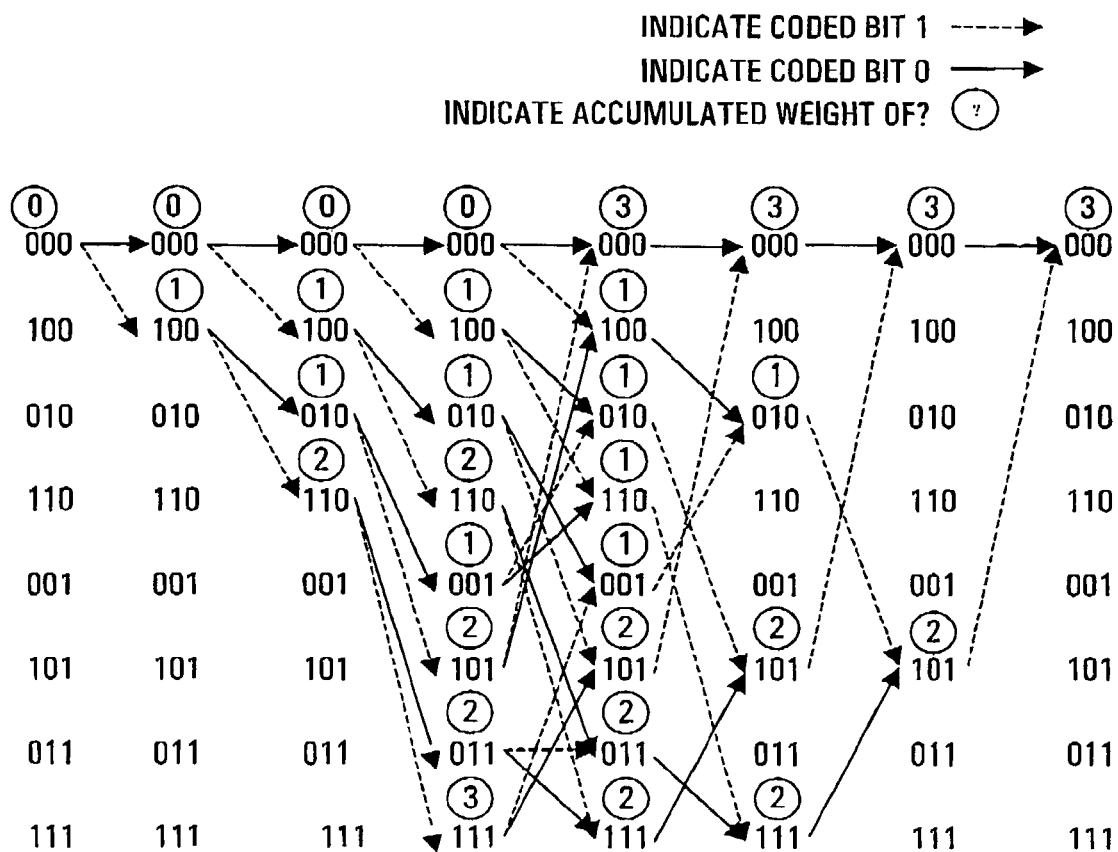
FIG. 22 is a Trellis diagram of the code of FIG. 20 showing the smallest Hamming weight.

As shown in FIG. 22, starting with partial syndrome of 000, there are two next states of partial syndromes, 000 and 100. This is because there is one valid present state to start with, and the 2 possible input bits that leads to the 2 next states. The algorithm will update the weight accumulated at these two nodes. Then, starting with these two nodes, it will lead to 4 possible next states. Again, the weights accumulated at these 4 nodes are calculated, and this process goes on recursively. Whenever two paths visit the same nodes, the path presenting less accumulated weight will be the survival path to that node. As shown in the diagram below, the smallest hamming weight and minimum distance of (7, 3) hamming codes with the polynomial, $X^3+X+1$, is 3.

Furthermore, by modifying the minimum distance algorithm slightly, it can be used to calculate the minimum weight of the cyclic codeword xor with a mask.

To calculate the minimum weight of codeword with mask, only some slight changes need to be made in the minimum weight calculation algorithm presented before. The changes correspond to re-labeling the branches of the trellis by XORING their original binary label with the corresponding bit in the mask under consideration. The algorithm for finding the minimum distance is applied to the modified trellis diagram corresponding to XORING each mask with the original trellis. In the case of several masks, the overall minimum distance is equal to the smallest hamming weight computed over all possible masks.

Masking the message bit allows transmitting data with higher bandwidth because it allows transmitting more information without increasing the length of the codeword. For example, if all codeword xor with a mask chosen from linear combinations of 3 non-zero, non-repeated masks generator, it can generate 7 more sets of codeword excluding the original set of codeword. On the receiver side, these extended 7 sets of codeword can be easily distinguished by their unique syndrome. This increases the information rate by three bits.

When XORING the code-words with the masks, it is desired that the minimum weight of the codeword resulted from masking is the same as the minimum weight of the codeword without masking. If the minimum weight is decreasing, this will cause the CRC decoder being less effective in detecting the channel errors. Thus, it is important to find out how many masks can be xored to the cyclic codeword without decreasing the minimum distance. In practice, one can randomly generate a set of base masks, compute all their possible linear combinations and then check for the minimum distance of the resulting code plus masks. This randomized search algorithm can be repeated for a number of times until either the desired number of masks are found, or the number of attempts of generating random base masks has exceeded a pre-determined threshold. In this case, if one successfully finds the desired number of base masks in a given run of the test algorithm, then one can increase the number of base masks and repeat the randomized search procedure for the updated number of desired base masks. The whole iterative procedure can continue for a number of times. The stopping criteria can be either the resulting minimum distance, or the error detection capability of the resulting code tested using computer simulations.

All the above described embodiments have focused on the use of a CRC, and then syndromes at the receiver to allow the embedding of a few extra bits either to identify a scrambling sequence or to identify some other data. In another embodiment, assuming that the encoding performed at the transmitter is done using a cyclic code, a set of extra generators can be added to block codes generated by the cyclic code. The extra generators are used to signify extra bits to be transmitted from the transmitter to the receiver. This again is useful in the context of a defined air interface standard in which one is trying to squeeze extra bits Out of a defined channel without changing the channel per se.

For example, suppose bits are transmitted in 100 bit frames consisting of 50 information bits and 50 parity bits. Before transmitting, the 100 bit frames can be xored with extra masks. The identity of these masks can be extracted at the receiver using the syndrome method discussed above in the context of the CRC. By looking up again in a syndrome table, an identification of which of the extra masks was used at the transmitter can be made, and this can be mapped to transmit information.

In the above illustrated examples, the processing at the transmitter to generate the different possible transmit signals using different scrambling sequences is shown to be conducted in parallel. However, in another embodiment, any amount of serialization can be employed. For example, all of the scrambling sequences can be applied one after another to generate a respective peak power and then the output associated with the best power is selected for transmission. In some embodiments, where serial processing is employed, a stopping criteria can be used to minimize the amount of processing power required. More specifically, after each sequence is applied and a peak power value determined, the peak power value thus determined is compared to a threshold acceptable peak power value. As soon as an output is found which results in an acceptable peak power, in this embodiment it is not necessary to exhaustively compute outputs for each of the other scrambling sequences, but rather the processing is stopped and the scrambling sequence which resulted in the acceptable peak power is used.

Numerous modifications and variations of the present invention are possible in light of the above teachings. It is therefore to be understood that within the scope of the appended claims, the invention may be practised otherwise than as specifically described herein.

[1] G. D. Forney, Jr. and L. F. Wei "Multidimensional constellations-Part I: Introduction, figures of merit, and generalized cross constellations," IEEE J. Select. Areas Commun., vol. SAC-7, pp. 877-892, August 1989.

[2] A. K. Khandani and P. Kabal, "Shaping multi-dimensional signal spaces-Part I: Optimum shaping, shell mapping," IEEE Trans. Inform. Theory, vol.IT-39, pp.1799-1808, November 1993.

[3] A. K. Khandani and P. Kabal, "Shaping multi-dimensional signal spaces-Part II: shell-addressed constellations," IEEE Trans. Inform. Theory, vol.IT-39, pp.1809-1819, November 1993.

[4] F. R. Kschischang and S. Pasupathy, "Optimal shaping properties of the truncated polydisc," IEEE Trans. Inform. Theory, vol.40, pp. 892--903, May 1994.

The invention claimed is:

1. A method comprising:
   calculating a CRC (cyclic redundancy check) for data block and combining the CRC with the data block;
   applying a plurality of different scrambling sequences to the CRC combined with the data block to generate a corresponding plurality of scrambled blocks;
   determining a respective communications performance characteristic associated with each of the scrambled blocks; and
   selecting one of the scrambled blocks for transmission as a function of the performance characteristics.

2. A method according to claim 1 further comprising:
   performing at least one signal processing step upon each scrambled block before determining the respective communications performance characteristic.

3. A method according to claim 2 wherein performing at least one signal processing step upon each scrambled block before determining the respective communications performance characteristic comprises:
   performing at least one step from a group consisting of: channel encoding, interleaving, modulation.

4. A method according to claim 2 wherein performing at least one signal processing step upon each scrambled block before determining the respective communications performance characteristic comprises:
   performing a frequency-to-time conversion operation.

5. A method according to claim 4 wherein performing a frequency-to-time conversion operation comprises performing an inverse fast Fourier transform (IFFT).

6. A method according to claim 5 wherein the communications performance characteristic comprises a peak power measurement or any measure representative of peak power determined by identifying a maximum value of a time domain signal output by the IFFT.

7. A method according to claim 4 wherein the data block has a size larger than a frequency-to-time conversion block size, and wherein performing a frequency-to-time conversion comprises performing a respective frequency-to-time conversion operation in respect of each of a plurality of subsets of the scrambled block.

8. A method according to claim 1 wherein the communications performance characteristic comprises a peak power measurement or any measure representative of peak power.

9. A method according to claim 1 wherein the communications performance characteristic comprises a combination of peak power and an average energy measurement or any measure representative of the combined effect of the peak power and the average energy.

10. A method according to claim 1 wherein the data block has a size smaller than a frequency-to-time conversion block size, the method further comprising:
    in respect of each of at least one additional data block:
    a) calculating a CRC for the additional data block and combining the CRC with the additional data block;
    b) applying a plurality of different scrambling sequences to the CRC combined with the additional data block to generate a corresponding plurality of scrambled blocks;
    wherein determining a respective communications performance characteristic associated with each of the scrambled blocks comprises:
    c) for each of a plurality of permutations of scrambled blocks, each permutation including one scrambled block for the data block and one scrambled block for each additional data block, combining the permutation of scrambled blocks and performing frequency-to-time conversion to generate a respective time domain signal;
    d) determining a respective communications performance characteristic for cacti time domain signal; and
    e) selecting one of the permutations of scrambled blocks for transmission as a function of the performance characteristics.

11. A method according to claim 1 wherein applying a plurality of different scrambling sequences to the CRC combined with the data block to generate a corresponding plurality of scrambled blocks is done in sequence.

12. A method according to claim 11 wherein applying a plurality of different scrambling sequences to the CRC combined with the data block to generate a corresponding plurality of scrambled blocks is done in sequence until a stopping criteria is satisfied.

13. A method according to claim 1 wherein applying a plurality of different scrambling sequences to the CRC combined with the data block to generate a corresponding plurality of scrambled blocks is done simultaneously for multiple scrambling sequences.

14. A method according to claim 1 further comprising performing multi-tone modulation by:
    defining a respective signal constellation comprising a plurality of constellation points for each of a plurality of center frequencies;
    defining for each tone and for each permutation of values for M data elements, a respective set of at least one constellation point any one of which may be used to represent the permutation of values for M data elements thereby providing a choice of constellation points for the permutation of values for M data elements, with at least one said set of at least one constellation point having more than one constellation point;

for each scrambled sequence, generating a multi-tone signal by mapping data elements of the scrambled sequence to each of said plurality of signal constellations and where there is a choice of constellation points, selecting a constellation point which will result in a reduced peak average power ratio for the multi-tone signal;

wherein the communications performance characteristic associated with each scrambled block is determined from the selected constellation points.

15. A method according to claim 14 wherein selecting a constellation point which will result in a reduced peak power for the multi-tone signal where there is a choice of constellation points comprises one of:

searching through all possible permutations of choices of constellation points for a set of constellation points which will result in an absolute minimum possible peak average power ratio; and searching through possible permutations of choices of constellation points for a set of constellation points which will result in a peak average power ratio which is less than a predetermined threshold.

16. A method comprising:

encoding a data block using a cyclic code to generate an encoded block;

applying at least one of a plurality of different scrambling sequences to the encoded block to generate a scrambled block, each of the plurality of different scrambling sequences being uniquely associated with a respective information;

transmitting at least one scrambled block;

wherein only one of the plurality of different scrambling sequences is applied to the encoded block to generate a scrambled block, the one being selected in order to convey the respective information.

17. An apparatus comprising:

a CRC encoder adapted to calculate a CRC (cyclic redundancy check) for a data block and combining the CRC with the data block;

at least one scrambling sequence generator adapted to apply a plurality of different scrambling sequences to the CRC combined with the data block to generate a corresponding plurality of scrambled blocks;

a signal selector adapted to determine a respective communications performance characteristic associated with each of the scrambled blocks and to select one of the scrambled blocks for transmission as a function of the performance characteristics.

18. An apparatus according to claim 17 further comprising:

at least one of a channel encoder, interleaver and modulator adapted to process each scrambled block before determination of the respective communications performance characteristic.

19. An apparatus according to claim 17 further comprising:

an FFT block adapted to performing a frequency to time conversion operation prior to determination of the respective communications performance characteristic.

20. An apparatus according to claim 17 wherein the communications performance characteristic comprises a peak power measurement or any measure representative of peak power.

21. An apparatus according to claim 17 wherein the communications performance characteristic comprises a combination of peak power and an average energy measurement or any measure representative of the combined effect of the peak power and the average energy.

22. An apparatus according to claim 17 wherein the communications performance characteristic comprises a peak power to average power ratio or any measure representative of the peak power to average power ratio.

23. An apparatus according to claim 22 wherein the one scrambled block is selected for transmission based on having a minimum peak power to average power ratio.

24. A method of de-scrambling a sequence, the method comprising:

maintaining a respective syndrome associated with each of a plurality of scrambling sequences;

performing a CRC computation on the sequence to generate a CRC output;

determining if there is a match between the CRC output and any of said syndromes;

if there is a match between the CRC output and a particular one of the syndromes, applying the respective scrambling sequence to the sequence to generate a de-scrambled sequence.

25. A method according to claim 24 further comprising:

receiving a signal;

performing at least one signal processing step upon the received signal to generate the sequence.

26. A method according to claim 25 wherein performing at least one signal processing step upon the received signal to generate the sequence comprises performing at least one step from a group consisting of:

channel decoding, de-interleaving, demodulation.

27. A method according to claim 25 wherein performing at least one signal processing step upon the received signal to generate the sequence comprises performing a time-to-frequency conversion operation.

28. A method according to claim 27 wherein performing a time-to-frequency operation comprises performing a fast Fourier transform (FFT).

29. A method according to claim 24 wherein the sequence comprises a plurality of smaller sequences each having a size smaller than a frequency-to-time conversion block size, the method further comprising:

performing a time to frequency conversion operation on a received signal to generate the sequence;

sub-dividing the sequence into the plurality of smaller sequences;

wherein performing a CRC computation on the sequence to generate a CRC output comprises performing a respective CRC computation on each of the plurality of smaller sequences to generate a respective CRC output; and for each of the plurality of smaller sequences and respective CRC outputs;

a) determining if there is a match between the respective CRC output and any of said syndromes;

b) if there is a match between the respective CRC output and a particular one of the syndromes, applying the respective scrambling sequence to the smaller sequence to generate a de-scrambled sequence.

30. A method according to claim 24 wherein the data block has a size larger than a frequency-to-time conversion block size, the method further comprising:

receiving a plurality of signals, and performing a time to frequency conversion on each of the received signals, and combining outputs of the time to conversion operations to generate the sequence.

31. A method according to claim 30 further comprising:
extracting information associated with did use of the respective scrambling sequence.

32. A method of de-scrambling a sequence, the method comprising:
maintaining a respective syndrome associated with each of a plurality of scrambling sequences;
performing a decoding operation associated with a cyclic code to generate a decoded output;
determining if there is a match between the decoded output and any of said syndromes;
if there is a match between the decoded output and a particular one of the syndromes, applying the respective scrambling sequence to the sequence to generate a de-scrambled sequence.

33. An apparatus comprising:
at least one storage element adapted to maintain a respective syndrome associated with each of a plurality of scrambling sequences;
a CRC device adapted to process a received data block of a sequence to generate a CRC output;
a descrambler adapted to determine if there is a match between the CRC output and any of said syndromes, and if there is a match between the CRC output and a particular one of the syndromes, to apply the respective scrambling sequence to the sequence to generate a de-scrambled sequence.

34. An apparatus according to claim 33 further comprising:
receiving circuitry for receiving a signal;
signal processing circuitry adapted to perform at least one signal processing step upon the received signal to generate the sequence.

35. An apparatus according to claim 33 further comprising at least one of:
a channel decode, de-interleaver, and demodulater.

36. An apparatus according to claim 33 further comprising time-to-frequency conversion circuitry adapted to perform a time-to-frequency conversion operation.

37. An apparatus according to claim 36 wherein the time-to-frequency conversion circuitry comprises a fast Fourier transform (FFT) function.

38. An apparatus according to claim 33 further adapted to extract information associated with the use of the respective scrambling sequence.

* * * * *

UNITED STATES PATENT AND TRADEMARK OFFICE
CERTIFICATE OF CORRECTION

PATENT NO. : 7,318,185 B2
APPLICATION NO. : 10/314347
DATED : January 8, 2008
INVENTOR(S) : Amir Khandani et al.

It is certified that error appears in the above-identified patent and that said Letters Patent is hereby corrected as shown below:

1) Column 13, line 30, "... $R_n$=48, 49, 50 and ..." should read -- ... $R'_n$=48, 49, 50 and ... --;

2) Column 13, line 42, "Let b=κ-$R'_n$ ..." should read --Let b=K-$R'_n$ ... --;

3) Column 16, line 18, "... Case I: 0010010 ..." should read -- ... Case I: 0010010 ........ --;

4) Column 28, claim 10, line 37, "... cacti ..." should read -- ... each ... --;

5) Column 31, claim 31, line 2, "... did ..." should read -- ... the ... --.

Signed and Sealed this

Fourth Day of November, 2008

JON W. DUDAS
*Director of the United States Patent and Trademark Office*